United States Patent
Cao et al.

(10) Patent No.: US 11,937,230 B2
(45) Date of Patent: *Mar. 19, 2024

(54) METHOD AND APPARATUS FOR WIRELESS COMMUNICATIONS

(71) Applicant: NXP USA, Inc., Austin, TX (US)

(72) Inventors: Rui Cao, Sunnyvale, CA (US); Hongyuan Zhang, Fremont, CA (US); Yan Zhang, Palo Alto, CA (US); Liwen Chu, San Ramon, CA (US); Hari Ram Balakrishnan, Chennai (IN); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/349,809

(22) Filed: Jun. 16, 2021

(65) Prior Publication Data

US 2021/0392661 A1    Dec. 16, 2021

Related U.S. Application Data

(60) Provisional application No. 63/137,240, filed on Jan. 14, 2021, provisional application No. 63/057,411, (Continued)

(30) Foreign Application Priority Data

Jul. 8, 2020  (IN) .............................. 202021029067
Jul. 23, 2020 (IN) .............................. 202021031523

(51) Int. Cl.
*H04W 4/00*   (2018.01)
*H04L 5/00*   (2006.01)
(Continued)

(52) U.S. Cl.
CPC ......... *H04W 72/1263* (2013.01); *H04L 5/001* (2013.01); *H04W 72/0453* (2013.01)

(58) Field of Classification Search
CPC ......... H04W 72/1263; H04W 72/0453; H04W 5/001
See application file for complete search history.

(56) References Cited

U.S. PATENT DOCUMENTS 9,913,168 B2 *  3/2018  Noh ..................... H04W 28/065
9,942,008 B1    4/2018  Sun et al.
(Continued)

FOREIGN PATENT DOCUMENTS

KR    20180079513 A    7/2018
WO    2007078712 A2    7/2007

OTHER PUBLICATIONS

Evgeny Khorov et al. A Tutorial on IEEE 802.11ax High Efficiency WLANs 2019 IEEE Communications Surveys & Tutorials, vol. 21, No. 1, p. 197-216 (Year: 2019).*
(Continued)

*Primary Examiner* — Abdelnabi O Musa

(57) ABSTRACT

Embodiments of a method and an apparatus for wireless communications are disclosed. In an embodiment, a method for wireless communications involves generating a Physical Layer Protocol Data Unit (PPDU) that includes a resource unit (RU), wherein a size of the RU is less than a signal bandwidth and wherein data corresponding to the RU is distributed onto a disjoint set of subcarriers included in a frequency unit, and transmitting the PPDU using the disjoint set of subcarriers in accordance with a power spectrum density (PSD) limit.

22 Claims, 16 Drawing Sheets

Related U.S. Application Data filed on Jul. 28, 2020, provisional application No. 63/039,538, filed on Jun. 16, 2020.

(51) Int. Cl.
*H04W 72/0453* (2023.01)
*H04W 72/1263* (2023.01)

(56) References Cited

U.S. PATENT DOCUMENTS

| | | | |
|---|---|---|---|
| 10,128,917 B2 | 11/2018 | Tian et al. | |
| 10,567,127 B2 * | 2/2020 | Sun | H04L 27/2602 |
| 10,616,017 B2 * | 4/2020 | Liu | H04L 27/2613 |
| 11,019,660 B2 | 5/2021 | Baron et al. | |
| 11,218,275 B2 | 1/2022 | Porat et al. | |
| 11,553,525 B2 | 1/2023 | Baron et al. | |
| 2017/0026151 A1 * | 1/2017 | Adachi | H04W 72/30 |
| 2017/0230220 A1 * | 8/2017 | Anwyl | H04L 5/0044 |
| 2018/0069669 A1 | 3/2018 | Park et al. | |
| 2018/0160429 A1 | 6/2018 | Seok | |
| 2018/0213566 A1 * | 7/2018 | Baron | H04W 72/569 |
| 2018/0242355 A1 * | 8/2018 | Lou | H04W 72/121 |
| 2019/0116014 A1 * | 4/2019 | Gan | H04W 72/04 |
| 2020/0228380 A1 * | 7/2020 | Yang | H04L 27/2621 |
| 2021/0184707 A1 | 6/2021 | Hasnain | |
| 2021/0274500 A1 * | 9/2021 | Cariou | H04W 72/0453 |
| 2021/0289500 A1 * | 9/2021 | Yang | H04W 72/0453 |
| 2021/0367886 A1 | 11/2021 | Chen et al. | |
| 2021/0385688 A1 | 12/2021 | Liu et al. | |
| 2021/0392661 A1 * | 12/2021 | Cao | H04L 5/0048 |
| 2022/0294558 A1 * | 9/2022 | Park | H04L 5/0007 |
| 2022/0393792 A1 | 12/2022 | Lim et al. | |
| 2022/0408462 A1 * | 12/2022 | Cao | H04L 5/0042 |
| 2022/0416988 A1 * | 12/2022 | Cao | H04L 5/0044 |
| 2023/0261788 A1 | 8/2023 | Lim et al. | |

OTHER PUBLICATIONS

U.S. Appl. No. 17/349,801, filed Jun. 16, 2021.

IEEE 802,1-20/0789rl, Liu et al (Mediatek), "Distributed tone design" Apr. 28, 2020, 21 pages.

IEEE 802,11-20/xxxxr0, Yang et al (Qualcomm), "Further Discussion on PSD Limited Transmission" Jun. 15, 2020, 18 pages.

IEEE P802.11 ax/D6.1 "27.3.12.13 Pilot subcarriers", May 2020, 5 pages.

IEEE, "IEEE P802.11ax™/D6.0", Draft Standard for Information technology—Telecommunications and information exchange between systems Local and metropolitan area networks Specific requirements, Nov. 2019, 780 pgs.

U.S. Appl. No. 17/139,656; 58 pages (filed Dec. 31, 2020).

Non-Final Office Action for U.S. Appl. No. 17/349,801 dated Jan. 9, 2023, 34 pages.

Final Office Action for U.S. Appl. No. 17/349,801 dated Jun. 9, 2023, 31 pages.

Notice of Allowance for U.S. Appl. No. 17/349,801 dated Aug. 28, 2023.

* cited by examiner

| BITS: | B0 | B3 B4 | B15 B16 | B17 | B18 B19 | B20 B21 | B22 | B23 B25 |
|---|---|---|---|---|---|---|---|---|
| | TRIGGER TYPE 702 | UL LENGTH 704 | MORE TF 706 | CS REQUIRED 708 | UL BW 710 | GI AND HE-LTF TYPE/ TXOP SHARING MODE 712 | MU-MIMO HE-LTF MODE 714 | NUMBER OF HE-LTF SYMBOLS AND MIDAMBLE PERIODICITY 716 |
| | 4 | 12 | 1 | 1 | 2 | 2 | 1 | 3 |

700

| BITS: | B26 | B27 | B28 B33 | B34 B35 | B36 | B37 B52 | B53 | B54 B62 | B63 | | |
|---|---|---|---|---|---|---|---|---|---|---|---|
| | UL STBC 718 | LDPC EXTRA SYMBOL SEGMENT 720 | AP TX POWER 722 | PRE-FEC PADDING FACTOR 724 | PE DISAMBIGUITY 726 | UL SPATIAL REUSE 728 | DOPPLER 730 | UL HE-SIG-A2 RESERVED 732 | RESERVED 734 | TRIGGER DEPENDENT COMMON INFO 736 | SPECIAL USER INFO 738 |
| | 1 | 1 | 6 | 2 | 1 | 16 | 1 | 9 | 1 | VARIABLE | |

FIG. 7

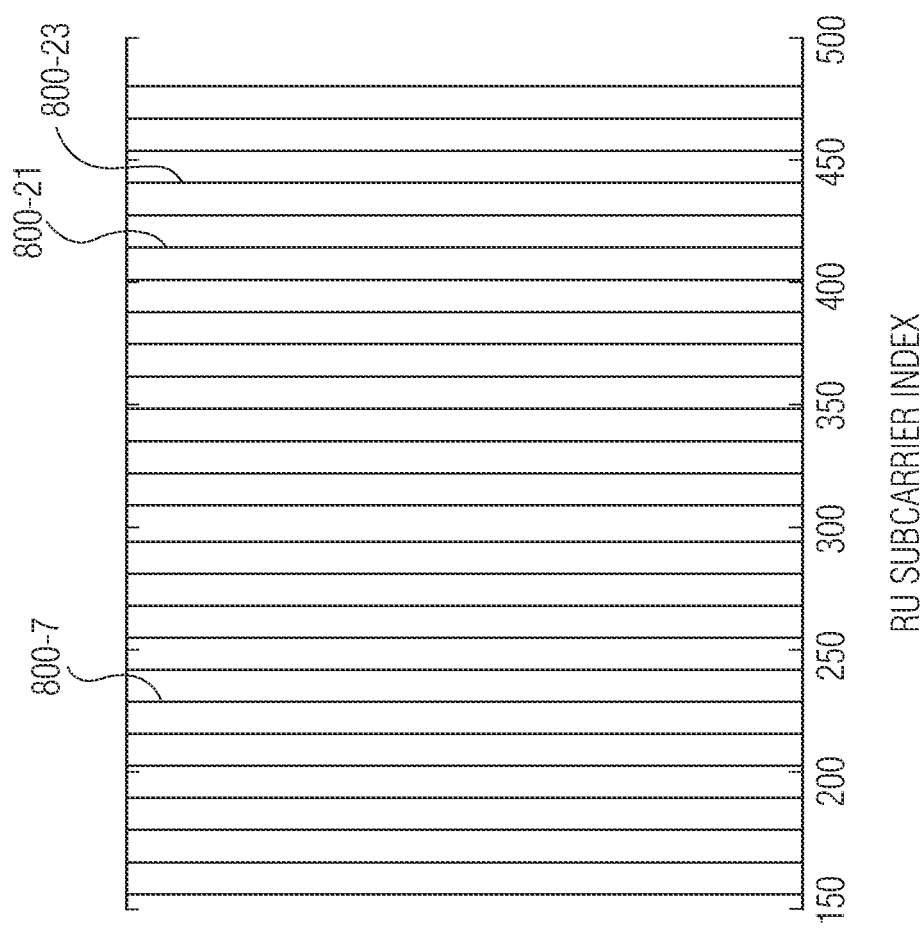

METHOD AND APPARATUS FOR WIRELESS COMMUNICATIONS

CROSS-REFERENCE TO RELATED APPLICATIONS

This application is entitled to the benefit of U.S. Provisional Patent Application Ser. No. 63/039,538, filed on Jun. 16, 2020, and India Provisional Patent Application Serial Number 202021029067, filed on Jul. 8, 2020, and India Provisional Patent Application Serial Number 202021031523, filed on Jul. 23, 2020, and U.S. Provisional Patent Application Ser. No. 63/057,411, filed on Jul. 28, 2020, and India Provisional Patent Application Serial Number 202021032534, filed on Jul. 29, 2020, and U.S. Provisional Patent Application Ser. No. 63/137,240, filed on Jan. 14, 2021, each of which is incorporated by reference herein.

BACKGROUND

In wireless communications, wireless devices, e.g., Access Point (AP) multi-link devices (MLDs) or non-AP MLDs, e.g., station (STA) multi-link devices (STA MLDs), can execute various multi-link operations, such as transmission and reception of frames via one or more communication links. As an example, a wireless AP MLD may transmit and receive Physical Layer Protocol Data Units (PPDUs) with a wireless non-AP MLD on multiple links to exchange information and transmit data. However, when a PPDU is transmitted in accordance with a power spectrum density (PSD) limit, the PPDU may be subject to a restricted transmission range and/or a restricted data rate. Therefore, because the PPDU may be subject to the restricted transmission range and/or the restricted data rate, wireless communications may not be performed efficiently.

SUMMARY

Embodiments of a method and an apparatus for wireless communications are disclosed. In an embodiment, a method for wireless communications involves generating a Physical Layer Protocol Data Unit (PPDU) that includes a resource unit (RU), wherein a size of the RU is less than a signal bandwidth and wherein data corresponding to the RU is distributed onto a disjoint set of subcarriers included in a frequency unit, and transmitting the PPDU using the disjoint set of subcarriers in accordance with a power spectrum density (PSD) limit.

In an embodiment, the PPDU using the disjoint set of subcarriers is at least one of transmitted and solicited using Orthogonal Frequency-Division Multiple Access (OFDMA).

In an embodiment, generating the PPDU comprises encoding a data portion of the PPDU using an encoding bandwidth and distributing the data corresponding to the RU onto the disjoint set of subcarriers across the signal bandwidth.

In an embodiment, the encoding bandwidth is 20 MHz and the signal bandwidth is 40 MHz, and wherein the data corresponding to the RU is distributed onto even subcarriers of two 242 RUs via a round robin distribution.

In an embodiment, the encoding bandwidth is 40 MHz and the signal bandwidth is at least 80 MHz, and wherein the data corresponding to the RU is encoded using a 484 RU that is distributed onto each 484 RU of the signal bandwidth.

In an embodiment, generating the PPDU comprises encoding a data portion of the PPDU using a distributed RU (dRU) within the frequency unit, and wherein data corresponding to the dRU is encoded and modulated as one regular RU.

In an embodiment, a dRU tone mapper distributes the data corresponding to the RU onto the disjoint set of subcarriers included in the frequency unit.

In an embodiment, a number of subcarriers included in the dRU is the same as the number of subcarriers included in a corresponding regular RU.

In an embodiment, the frequency unit is at least one of 20 MHz, 40 MHz, and 80 MHz.

In an embodiment, the frequency unit is 20 MHz, and wherein each 20 MHz of the signal bandwidth includes at least one of nine 26-subcarrier dRUs that are each nine subcarriers apart and thirteen 18-subcarrier dRUs that are each thirteen subcarriers apart.

In an embodiment, a base dRU is duplicated across at least two 20 MHz frequency units included in the signal bandwidth using at least one of a Dual Carrier Modulation (DCM), a Quadrature Carrier Modulation (QCM), and a phase change.

In an embodiment, the frequency unit is 40 MHz, and wherein the signal bandwidth includes a base dRU that is at least one of a 26-subcarrier dRU and an 18-subcarrier dRU.

In an embodiment, the base dRU is duplicated across at least two 40 MHz frequency units included in the signal bandwidth using at least one of a DCM, a QCM, and a phase change.

In an embodiment, for up-link (UL) triggered transmissions, the RU is at least one of a regular RU and a distributed RU that is signaled by an RU type bit included in a trigger frame.

In an embodiment, the RU type bit is included in at least one of a User Info field and a Common Info field.

In an embodiment, the RU type bit included in the trigger frame is one bit that indicates whether each RU is at least one of the regular RU and the distributed RU.

In an embodiment, the RU type bit included in the trigger frame is an N bit field that indicates whether RUs within each frequency unit are at least one of the regular RU and the distributed RU.

In an embodiment, a payload of one user is transmitted on different RUs via different data symbols included in the PPDU in a dispersed RU transmission.

In an embodiment, the data corresponding to the RU is distributed onto the disjoint set of subcarriers using a Global Distributed Tone Mapping ($D_{TM}$) subcarrier distribution style that maps pilot tones for the RU size onto even number subcarriers.

An embodiment of a wireless device is also disclosed. The wireless device includes a processor configured to generate a PPDU that includes an RU, wherein a size of the RU is less than a signal bandwidth and wherein data corresponding to the RU is distributed onto a disjoint set of subcarriers included in a frequency unit, and transmit the PPDU using the disjoint set of subcarriers in accordance with a PSD limit.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 7 depicts an example of a Common Info field that may be used to signal whether a requested RU is a regular RU or a distributed RU.

FIG. 8C depicts another example of distributed pilot tones in accordance with Global $D_{TM}$ subcarrier distribution.

Throughout the description, similar reference numbers may be used to identify similar elements.

DETAILED DESCRIPTION

Figure 1:
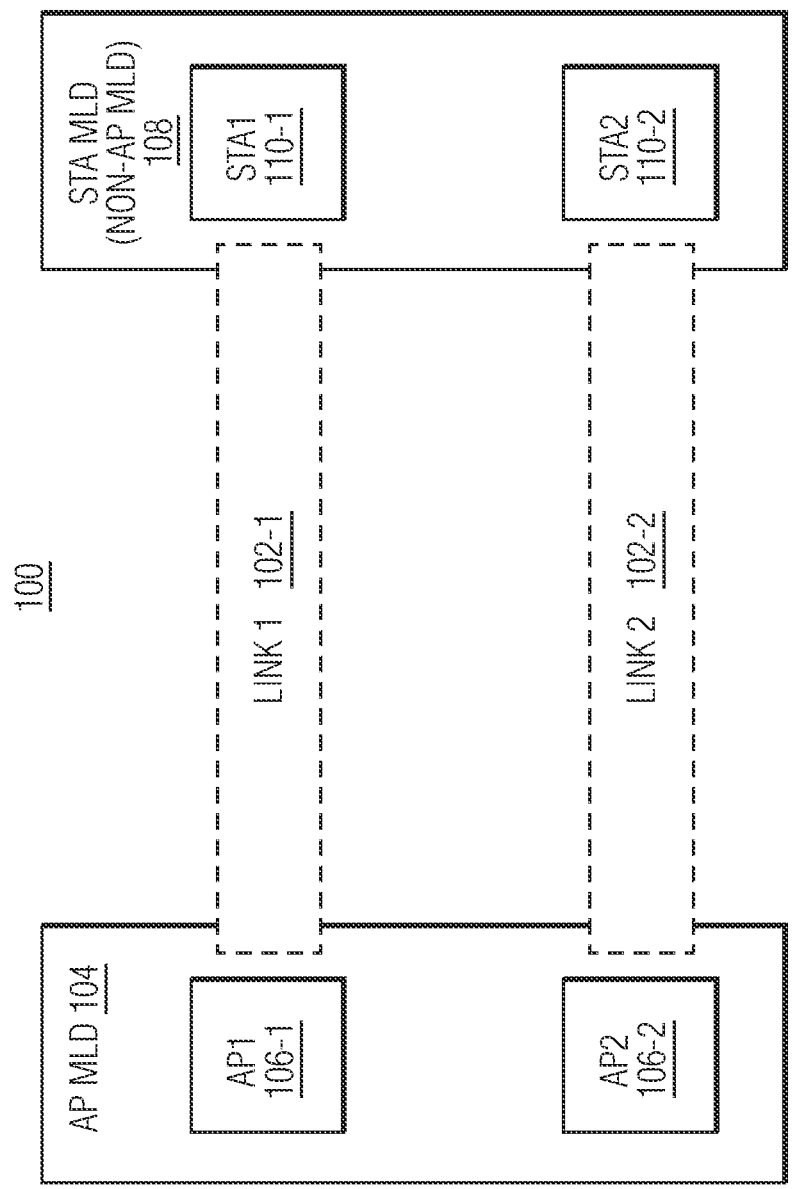
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless communications system, an access point (AP) affiliated with an AP multi-link device (MLD) (e.g., wireless device) of a wireless local area network (WLAN) transmits data to at least one associated non-AP station (STA) affiliated with a non-AP STA MLD (e.g., a STA MLD). The AP MLD is configured to operate with associated non-AP MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communication systems operating in accordance with the EHT communication protocol and/or next-generation communication protocols may be referred to herein as "non-legacy" features. In some embodiments of the wireless communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., IEEE 802.11n, IEEE 802.11ac, IEEE 802.11ax, etc.) may be collectively referred to herein as "legacy" communication protocols.

FIG. 1 depicts a multi-link communications system 100 that is used for wireless (e.g., WiFi) communications. In the embodiment depicted in FIG. 1, the multi-link communications system includes one AP multi-link device, which is implemented as AP MLD 104, and one non-AP STA multi-link device, which is implemented as STA MLD 108. The multi-link communications system can be used in various applications, such as industrial applications, medical applications, computer applications, and/or consumer or enterprise applications. In some embodiments, the multi-link communications system is a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes multiple AP MLDs with one STA MLD, or multiple AP MLDs with more than one STA MLD. In another example, although the multi-link communications system is shown in FIG. 1 as being connected in a certain topology, the network topology of the multi-link communications system is not limited to the topology shown in FIG. 1. Although the system described with reference to FIG. 1 involves multi-link communications, the techniques described herein are also applicable to single-link communications.

In the embodiment depicted in FIG. 1, the AP MLD 104 includes two radios, implemented as access points (APs) 106-1 and 106-2. In such an embodiment, the APs may be AP1 106-1 and AP2 106-2. In some embodiments, the AP MLD 104 implements upper layer Media Access Control (MAC) functionalities (e.g., block acknowledgement establishment, reordering of frames, etc.) and the APs 106-1 and 106-2 implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11be protocol. In some embodiments, an AP is a wireless AP that connects to a local area network (e.g., a LAN) and/or to a backbone network (e.g., the Internet) through a wired connection and that wirelessly connects to wireless stations (STAs), for example, through one or more WLAN communications protocols, such as the IEEE 802.11 protocol. In some embodiments, an AP includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different size BSS operating channel. For example, AP1 106-1 may operate in a 320 MHz BSS operating channel and AP2 106-2 may operate in a 160 MHz BSS operating channel. Although the AP MLD 104 is shown in FIG. 1 as including two APs, other embodiments of the AP MLD 104 may include more than two APs.

In the embodiment depicted in FIG. 1, the non-AP STA multi-link device, implemented as STA MLD 108, includes two radios which are implemented as non-AP STAs 110-1 and 110-2. In such an embodiment, the non-AP STAs may be STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the non-AP STAs 110-1 and 110-2 are part of the STA MLD 108, such that the STA MLD is a communications device that wirelessly connects to wireless APs. For example, the STA MLD 108 may be implemented in a laptop, a desktop personal computer (PC), a mobile phone, or other communications device that supports at least one WLAN communications protocol. In some embodiments, the non-AP STA MLD 108 is a communications device compatible with at least one IEEE 802.11 protocol (e.g., the IEEE 802.11be protocol). In some embodiments, the STA MLD 108 implements a common MAC data service interface and the non-AP STAs 110-1 and 110-2 implement a lower layer MAC data service interface. In some embodiments, the AP MLD 104 and/or the STA MLD 108 identifies which communication links support the multi-link operation during a multi-link operation setup phase and/or exchanges information regarding multi-link capabilities during the multi-link operation setup phase. In some embodiments, each of the non-AP STAs 110-1 and 110-2 of the STA MLD 108 may operate in a different frequency band. For example, the non-AP STA 110-1 may operate in a frequency band less than 6 GHz (e.g., 2.4 GHz or 5 GHz) and the non-AP STA 110-2 may operate in frequency band of 6 GHz. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the STA MLD 108 communicates with the AP MLD 104 via two communication links, e.g., link1 102-1 and link2 102-2. For example, each of the non-AP STAs 110-1 or 110-2 communicates with an AP 106-1 or 106-2 via corresponding communication links 102-1 or 102-2. In an embodiment, a communication link (e.g., link1 102-1 or link2 102-2) may include a BSS operating channel established by an AP (e.g., AP1 106-1 or AP2 106-2) that features multiple 20 MHz channels used to transmit frames (e.g., Physical Layer Protocol Data Units (PPDUs), Beacons, management frames, etc.) between a first wireless device (e.g., an AP) and a second wireless device (e.g., a non-AP STA). In some embodiments, a 20 MHz channel may be a punctured 20 MHz channel or an unpunctured 20 MHz channel. In some embodiments, the 20 MHz channels may be aggregated to form a segment (e.g., an 80 MHz segment or a 160 MHz segment). Although the STA MLD 108 is shown in FIG. 1 as including two non-AP STAs, other embodiments of the STA MLD 108 may include one non-AP STA or more than two non-AP STAs. In addition, although the AP MLD 104 communicates (e.g., wirelessly communicates) with the STA MLD 108 via multiple links 102-1 and 102-2, in other embodiments, the AP MLD 104 may communicate (e.g., wirelessly communicates) with the STA MLD 108 via one link or more than two communication links.

In some embodiments, wireless devices (e.g., APs or non-AP STAs) operating according to at least one legacy communication protocol may operate in a frequency band of less than 6 GHz. In some embodiments, frequency bands utilized in a less than 6 GHz range may include, for example, Unlicensed National Information Infrastructure (U-NII)-1, U-NII-2A, U-NII-2B, U-NII-2C, U-NII-3, U-NII-4, or U-NII-5. For wireless devices operating in frequency bands less than 6 GHz, there may be no power spectrum density (PSD) limit for wireless transmissions or the PSD limit may be higher than a practical PSD of a packet that a STA can transmit. Instead, for wireless devices operating in frequency bands less than 6 GHz, there may be a per-STA Equivalent Isotopically Radiated Power (EIRP) limit. Thus, to extend transmission range in frequency bands less than 6 GHz, wireless devices (e.g., APs or non-AP STAs) operating according to at least one legacy communication protocol may, for example, reduce transmission bandwidth of a PPDU to increase per-subcarrier power.

However, in some embodiments, wireless devices (e.g., APs or non-AP STAs) operating according to at least one non-legacy communication protocol (e.g., the EHT communication protocol) may operate in a frequency band of 6 GHz. In some embodiments, frequency bands utilized within a 6 GHz range may include, for example, U-NII-5, U-NII-6, U-NII-7, or U-NII-8. In an embodiment, a low power indoor (LPI) transmission mode that may be in accordance with, for example, Federal Communications Commission (FCC) regulations, may be defined for transmissions in the frequency band of 6 GHz. In some embodiments, the LPI transmission mode may include a PSD limit for wireless devices (e.g., APs or non-AP STAs) transmitting PPDUs in the 6 GHz frequency band. For example, when a PPDU is transmitted in a frequency band of 6 GHz, the PSD may be limited to 5 dBm per 1 MHz for an AP and −1 dBm per 1 MHz for a non-AP STA. In such an example, wireless devices (e.g., APs or non-AP STAs) operating according to at least one non-legacy communication protocol (e.g., the EHT communication protocol) may have to increase PPDU bandwidth to allow for greater transmission power and extended transmission range in Orthogonal Frequency-Division Multiple Access (OFDMA) transmissions. As a result, different communication techniques that can extend the transmission range of a PPDU transmitted in accordance with a PSD limit in OFDMA extended transmissions may be desirable.

In accordance with an embodiment of the invention, a technique for wireless communications may involve generating a PPDU that includes a resource unit (RU), wherein a size of the RU is less than a signal bandwidth and wherein data corresponding to the RU is distributed onto a disjoint set of subcarriers included in a frequency unit, and transmitting the PPDU using the disjoint set of subcarriers in accordance with a PSD limit. Thus, techniques described herein may enable wireless devices to increase the power of PPDUs transmitted in PSD limited transmissions. Increasing the power of PPDUs transmitted in PSD limited transmissions may allow wireless devices to achieve longer range transmission in frequency bands with a PSD limit and may further enable wireless communications to be performed more efficiently.

Functional block diagrams of techniques for generating a PPDU where data corresponding to an RU is distributed onto a disjoint set of subcarriers are described in further detail below with reference to FIGS. 2A-2D.

Figure 2A:
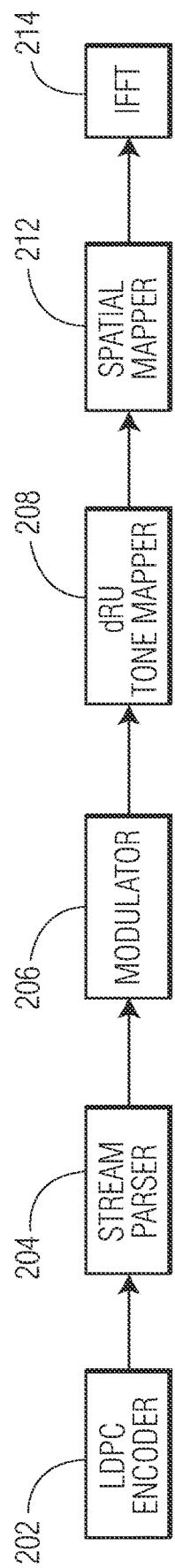
FIG. 2A is a functional block diagram of a technique for generating a Physical Layer Protocol Data Unit (PPDU), such that data corresponding to a Resource Unit (RU) may be distributed onto a disjoint set of subcarriers in accordance with an embodiment of the invention.

FIG. 2A is a functional block diagram of a technique for generating a PPDU (not shown), such that data corresponding to an RU may be distributed onto a disjoint set of subcarriers in accordance with an embodiment of the invention. With reference to FIG. 2A, the functional block diagram includes a Low-Density Parity-Check (LDPC) encoder 202 (e.g., a forward error correction encoder) that encodes scrambled information bits to generate encoded data for the PPDU. In an embodiment, the functional block diagram also includes a stream parser 204 that receives and parses the encoded data into one or more spatial streams. In such an embodiment, a modulator 206 then modulates the parsed data to include data corresponding to an RU to be transmitted in the PPDU.

In an embodiment, a distributed RU (dRU) tone mapper 208 may receive the modulated data and distribute (using an encoding bandwidth) the modulated data corresponding to the RU onto a disjoint set of subcarriers a signal bandwidth. As described herein, the signal bandwidth may refer to a transmission bandwidth of a PPDU (e.g., PPDU bandwidth). Examples of the signal bandwidth may include 20 MHz, 40 MHz, 80 MHz, 160 MHz, 320 MHz, or more than 320 MHz. In an embodiment, a spatial mapper 212 maps the disjoint set of subcarriers onto at least one transmission chain for an inverse fast Fourier transformer, implemented as IFFT 214. At the IFFT 214, bits of a corresponding transmission chain undergo inverse fast Fourier transform (IFFT) in generating the PPDU. In some embodiments, the PPDU generated by the functional block diagram shown in FIG. 2A may be a PPDU for OFDMA transmissions and/or an EHT PPDU that may be transmitted by a wireless device in accordance with a PSD limit.

Figure 2B:
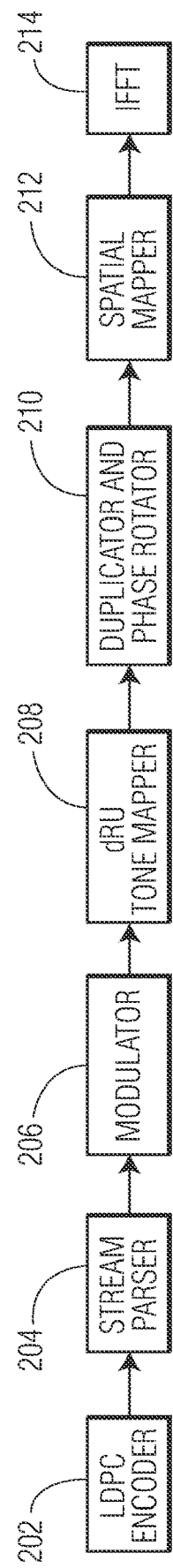
FIG. 2B is another functional block diagram of a technique for generating a PPDU, such that data corresponding to an RU may be distributed onto a disjoint set of subcarriers in accordance with an embodiment of the invention.

FIG. 2B is another functional block diagram of a technique for generating a PPDU (not shown), such that data corresponding to an RU may be distributed onto a disjoint set of subcarriers in accordance with an embodiment of the invention. With reference to FIG. 2B, the functional block diagram includes an LDPC encoder 202 (e.g., a forward error correction encoder) that encodes scrambled information bits to generate encoded data for the PPDU. In an embodiment, the functional block diagram also includes a stream parser 204 that receives and parses the encoded data into one or more spatial streams. In such an embodiment, a modulator 206 then modulates the parsed data to include data corresponding to an RU to be transmitted in the PPDU. In an embodiment, a dRU tone mapper 208 may receive the modulated data and distribute (using a frequency unit) the modulated data corresponding to the RU onto a disjoint set of subcarriers included in a frequency unit. Examples of the frequency unit may include 20 MHz, 40 MHz, or 80 MHz.

In an embodiment, a duplicator and phase rotator 210 may receive the modulated data corresponding to the RU and perform duplication and/or phase rotation of the frequency unit across a signal bandwidth of the PPDU. Examples of the signal bandwidth may include 20 MHz, 40 MHz, 80 MHz, 160 MHz, 320 MHz, or more than 320 MHz. In some embodiments, "duplicated" may imply that the contents (e.g., data, information, bits, etc.) of each field for a 20 MHz channel of the PPDU are duplicated across the signal bandwidth and/or are the same for each corresponding field in other 20 MHz channels of the PPDU. In some embodiments, a "phase rotation" may imply that a number of phase rotation parameters may be applied to subcarriers (sometimes referred to herein as "tones") included in the signal bandwidth. In some embodiments, the modulated data corresponding to the RU may be duplicated and/or undergo phase rotation for each frequency unit of the signal bandwidth (e.g., four 80 MHz frequency units of a 320 MHz signal bandwidth). In an embodiment, after the data corresponding to the RU undergoes duplication and/or phase rotation, a spatial mapper 212 maps the disjoint set of subcarriers onto at least one transmission chain for an inverse fast Fourier transformer, implemented as IFFT 214. At the IFFT 214, bits of a corresponding transmission chain undergo IFFT in generating the PPDU. In some embodiments, the PPDU generated by the functional block diagram shown in FIG. 2B may be a PPDU for OFDMA transmissions and/or an EHT PPDU that may be transmitted by a wireless device in accordance with a PSD limit.

Figure 2C:
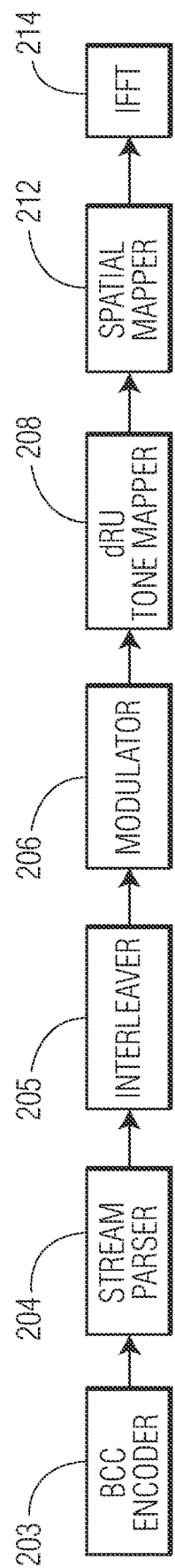
FIG. 2C is another functional block diagram of a technique for generating a PPDU, such that data corresponding to an RU may be distributed onto a disjoint set of subcarriers in accordance with an embodiment of the invention.

FIG. 2C is another functional block diagram of a technique for generating a PPDU, such that data corresponding to an RU may be distributed onto a disjoint set of subcarriers in accordance with an embodiment of the invention. With reference to FIG. 2C, the functional block diagram includes a binary convolutional code (BCC) encoder 203 (e.g., a forward error correction encoder) that encodes scrambled information bits to generate encoded data for the PPDU. In another embodiment, the BCC encoder 203 includes a binary convolutional encoder followed by a puncturing block. In an embodiment, the functional block diagram also includes a stream parser 204 that receives and parses the encoded data into one or more spatial streams. In an embodiment, an interleaver 205 receives the parsed data of the one or more spatial streams and interleaves the data of the corresponding spatial streams. In such an embodiment, a modulator 206 then modulates the interleaved data to include data corresponding to an RU to be transmitted in the PPDU.

In an embodiment, a dRU tone mapper 208 may receive the modulated data and distribute (using an encoding bandwidth) the modulated data corresponding to the RU onto a disjoint set of subcarriers included in a frequency unit of a signal bandwidth. Examples of the signal bandwidth may include 20 MHz, 40 MHz, 80 MHz, 160 MHz, 320 MHz, or more than 320 MHz. In an embodiment, a spatial mapper 212 maps the disjoint set of subcarriers onto at least one transmission chain for an inverse fast Fourier transformer, implemented as IFFT 214. At the IFFT 214, bits of a corresponding transmission chain undergo IFFT in generating the PPDU. In some embodiments, the PPDU generated by the functional block diagram shown in FIG. 2C may be a PPDU for OFDMA transmissions and/or an EHT PPDU that may be transmitted by a wireless device in accordance with a PSD limit.

Figure 2D:
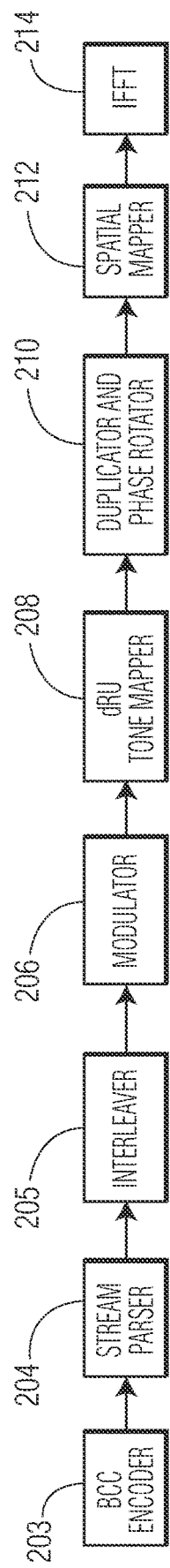
FIG. 2D is another functional block diagram of a technique for generating a PPDU, such that data corresponding to an RU may be distributed onto a disjoint set of subcarriers in accordance with an embodiment of the invention.

FIG. 2D is another functional block diagram of a technique for generating a PPDU, such that data corresponding to an RU may be distributed onto a disjoint set of subcarriers in accordance with an embodiment of the invention. With reference to FIG. 2D, the functional block diagram includes a BCC encoder 203 (e.g., a forward error correction encoder) that encodes scrambled information bits to generate encoded data for the PPDU. In another embodiment, the BCC encoder 203 includes a binary convolutional encoder followed by a puncturing block. In an embodiment, the functional block diagram also includes a stream parser 204 that receives and parses the encoded data into one or more spatial streams. In an embodiment, an interleaver 205 receives the parsed data of the one or more spatial streams and interleaves the data of the corresponding spatial streams. In such an embodiment, a modulator 206 then modulates the interleaved data to include data corresponding to an RU to be transmitted in the PPDU. In an embodiment, a dRU tone mapper 208 may receive the modulated data and distribute (using a frequency unit) the modulated data corresponding to the RU onto a disjoint set of subcarriers included in a frequency unit. Examples of the frequency unit may include 20 MHz, 40 MHz, or 80 MHz.

In an embodiment, a duplicator and phase rotator 210 may receive the modulated data corresponding to the RU and perform duplication and/or phase rotation of the frequency unit across a signal bandwidth of the PPDU. Examples of the signal bandwidth may include 20 MHz, 40 MHz, 80 MHz, 160 MHz, 320 MHz, or more than 320 MHz. In some embodiments, "duplicated" may imply that the contents (e.g., data, information, bits, etc.) of each field for a 20 MHz channel of the PPDU are duplicated across the signal bandwidth and/or are the same for each corresponding field in other 20 MHz channels of the PPDU. In some embodiments, a "phase rotation" may imply that a number of phase rotation parameters may be applied to subcarriers (sometimes referred to herein as "tones") included in the signal bandwidth. In some embodiments, the modulated data corresponding to the RU may be duplicated and/or undergo phase rotation for each frequency unit of the signal bandwidth (e.g., four 80 MHz frequency units of a 320 MHz signal bandwidth). In an embodiment, after the data corresponding to the RU undergoes duplication and/or phase rotation, a spatial mapper 212 maps the disjoint set of subcarriers onto at least one transmission chain for an inverse fast Fourier transformer, implemented as IFFT 214. At the IFFT 214, bits of a corresponding transmission chain undergo IFFT in generating the PPDU. In some embodiments, the PPDU generated by the functional block diagram shown in FIG. 2D may be a PPDU for OFDMA transmissions and/or an EHT PPDU that may be transmitted by a wireless device in accordance with a PSD limit.

Example of PPDUs that may be transmitted by a wireless device in accordance with a PSD limit are described in further detail below with reference to FIGS. 3A-3C.

Figure 3A:
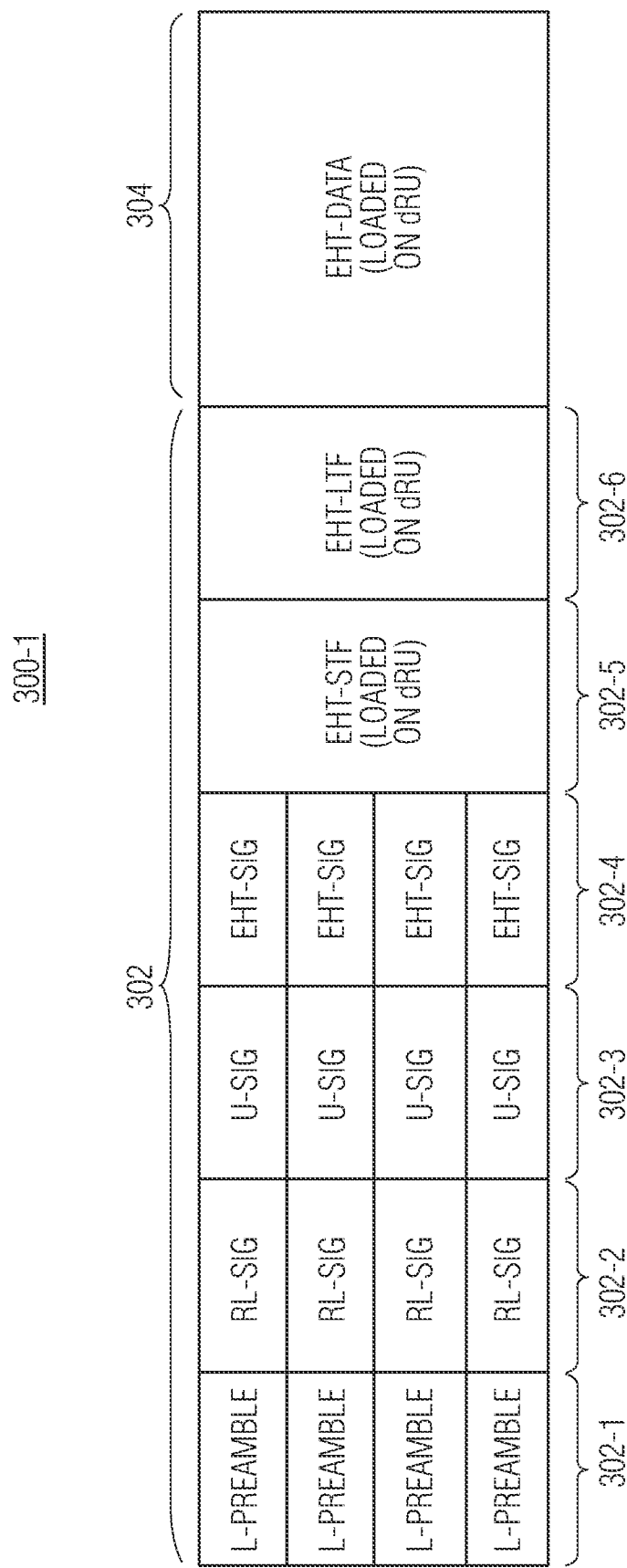
FIG. 3A depicts an example of a PPDU that may be transmitted by a wireless device in accordance with a power spectrum density (PSD) limit.

FIG. 3A depicts an example of a PPDU, 300-1, that may be transmitted by a wireless device in accordance with a PSD limit. In some embodiments, the PPDU 300-1 may be a PPDU for OFDMA transmissions and/or an EHT PPDU generated using the functional block diagram shown in FIGS. 2A-2D, such that the PPDU may be transmitted or solicited using OFDMA. In some embodiments, the PPDU 300-1 may be a non-trigger-based PPDU. In some embodiments, the PPDU 300-1 may include an RU (not shown) that is less than a signal bandwidth, such that data corresponding to the RU may be distributed onto a disjoint set of subcarriers (not shown) included in a frequency unit. In particular, FIG. 3A depicts a 20 MHz preamble portion 302 and a data portion 304 that are each included in the PPDU 300-1. With reference to FIG. 3A, each row included in the 20 MHz preamble portion 302 may represent a 20 MHz channel of a signal bandwidth, such that the signal bandwidth may be, for example, 40 MHz, 80 MHz, 160 MHz, 320 MHz, or more than 320 MHz.

In an embodiment, the 20 MHz preamble portion 302 of the PPDU 300-1 includes four fields that are duplicated for each 20 MHz channel of the signal bandwidth and two fields that may be loaded onto a dRU. As an example, a dRU may be defined as a set of distributed subcarriers within a certain frequency unit, such that data corresponding to the dRU may be encoded and modulated as one RU. The six fields of the 20 MHz preamble portion 302 are implemented as a first field 302-1 (shown as including Legacy-Preamble field (L-Preamble)), a second field 302-2 (shown as including Repeated Legacy Signal field (RL-SIG)), a third field 302-3

(shown as including Universal Signal field (U-SIG)), a fourth field 302-4 (shown as including EHT Signal field (EHT-SIG)), a fifth field 302-5 (shown as including EHT-Short Training field (EHT-STF)) that may be loaded onto a dRU, and a sixth field 302-6 (shown as including EHT-Long Training field (EHT-LTF)) that may be loaded onto a dRU. In some embodiments, "duplicated" may imply that the contents (e.g., data, information, bits, etc.) of each field for a 20 MHz channel are duplicated across the signal bandwidth and/or are the same for each corresponding field in other 20 MHz channels of the PPDU. For example, the contents of the first field 302-1 (shown as L-Preamble) in a first 20 MHz channel (shown by the first row) of the PPDU 300-2 may be repeated and/or the same as the contents of the first field in a second 20 MHz channel (shown by the second row), a third 20 MHz channel (shown by the third row), a fourth 20 MHz channel (shown by the fourth row), and/or other 20 MHz channels (not shown) included in the signal bandwidth of the PPDU.

In an embodiment, the data portion 304 of the PPDU 300-1 may include EHT data (EHT-DATA) that may be loaded onto a dRU. In such an embodiment, the data portion 304 may be encoded using an encoding bandwidth. For example, the data portion 304 of the PPDU 300-1 shown in FIG. 3A is encoded using an 80 MHz encoding bandwidth. In addition, the data portion 304 may involve distributing data corresponding to the RU onto the disjoint set of subcarriers across the signal bandwidth. For example, the data portion 304 of the PPDU 300-1 may distribute data corresponding to the RU onto the disjoint set of subcarriers across a signal bandwidth of 80 MHz, 160 MHz, 320 MHz, or more than 320 MHz.

In other embodiments (not shown), the encoding bandwidth may be 40 MHz and the signal bandwidth may be at least 80 MHz. In such an embodiment, when the data portion 304 is encoded using an encoding bandwidth of 40 MHz, each 40 MHz segment may be duplicated (e.g., a 40 MHz segment is duplicated to become two 40 MHz segments) and implemented as an 80 MHz segment. For example, a 320 MHz signal bandwidth may include four 80 MHz segments when encoded using a 40 MHz encoding bandwidth. As another example, when encoding is performed using a 40 MHz encoding bandwidth, a 160 MHz signal bandwidth may include two 80 MHz segments and an 80 MHz signal bandwidth may include one 80 MHz segment. In addition, in some embodiments, the data portion 304 may be modulated by the modulator 206 shown in FIG. 2A or FIG. 2C. In some embodiments, distribution of the data corresponding to the RU onto the disjoint set of subcarriers included in the data portion 304 may be performed via the dRU tone mapper 208 shown in FIG. 2A or FIG. 2C.

Figure 3B:
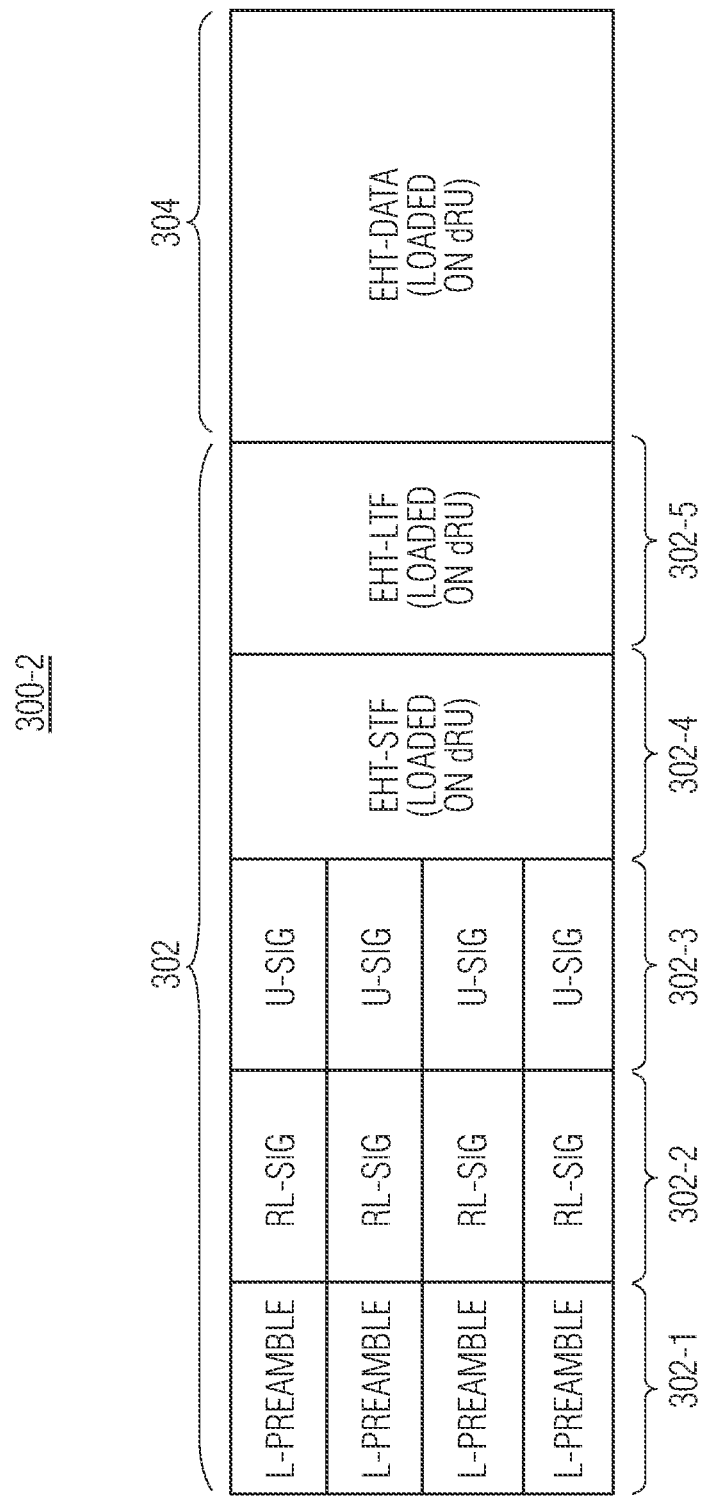
FIG. 3B depicts another example of a PPDU that may be transmitted by a wireless device in accordance with a PSD limit.

FIG. 3B depicts another example of a PPDU, 300-2, that may be transmitted by a wireless device in accordance with a PSD limit. In some embodiments, the PPDU 300-2 may be a PPDU for OFDMA transmissions and/or an EHT PPDU generated using the functional block diagram shown in FIGS. 2A-2D, such that the PPDU may be transmitted or solicited using OFDMA. In some embodiments, the PPDU 300-2 may be a trigger-based PPDU. In some embodiments, the PPDU 300-2 may include an RU (not shown) that is less than a signal bandwidth, such that data corresponding to the RU may be distributed onto a disjoint set of subcarriers (not shown) included in a frequency unit. In particular, FIG. 3B depicts a 20 MHz preamble portion 302 and a data portion 304 that are each included in the PPDU 300-2. With reference to FIG. 3B, each row included in the 20 MHz preamble portion 302 may represent a 20 MHz channel of a signal bandwidth, such that the signal bandwidth may be, for example, 40 MHz, 80 MHz, 160 MHz, 320 MHz, or more than 320 MHz.

In an embodiment, the 20 MHz preamble portion 302 of the PPDU 300-2 includes three fields that are duplicated for each 20 MHz channel of the signal bandwidth and two fields that may be loaded onto a dRU. The five fields of the 20 MHz preamble portion 302 are implemented as a first field 302-1 (shown as including L-Preamble), a second field 302-2 (shown as including RL-SIG), a third field 302-3 (shown as including U-SIG), a fourth field 302-4 (shown as including EHT-STF) that may be loaded onto a dRU, and a fifth field 302-5 (shown as including EHT-LTF) that may be loaded onto a dRU. In some embodiments, "duplicated" may imply that the contents (e.g., data, information, bits, etc.) of each field for a 20 MHz channel are duplicated across the signal bandwidth and/or are the same for each corresponding field in other 20 MHz channels of the PPDU. For example, the contents of the first field 302-1 (shown as L-Preamble) in a first 20 MHz channel (shown by the first row) of the PPDU 300-2 may be repeated and/or the same as the contents of the first field in a second 20 MHz channel (shown by the second row), a third 20 MHz channel (shown by the third row), a fourth 20 MHz channel (shown by the fourth row), and/or other 20 MHz channels (not shown) included in the signal bandwidth of the PPDU.

In an embodiment, the data portion 304 of the PPDU 300-2 may include EHT data (EHT-DATA) that may be loaded onto a dRU. In such an embodiment, the data portion 304 of the PPDU may be encoded using a dRU within a frequency unit. In such an embodiment, the data portion 304 of the PPDU 300-2 may be encoded using a frequency unit that is duplicated across the signal bandwidth. For example, the data portion 304 of the PPDU 300-2 shown in FIG. 3B is encoded using an 80 MHz frequency unit.

In other embodiments (not shown), the frequency unit may also be 20 MHz or 40 MHz and the signal bandwidth may be less than 80 MHz or greater than 80 MHz, such that there may be more than two segments or less than two segments included in the data portion 304. For example, a 320 MHz signal bandwidth may include four 80 MHz segments when encoded using an 80 MHz frequency unit, eight 40 MHz segments when encoded using a 40 MHz frequency unit, or sixteen 20 MHz segments when encoded using a 20 MHz frequency unit. As another example, a 160 MHz signal bandwidth may include two 80 MHz segments when encoded using an 80 MHz frequency unit, four 40 MHz segments when encoded using a 40 MHz frequency unit, or eight 20 MHz segments when encoded using a 20 MHz frequency unit. In addition, in some embodiments, the data portion 304 may be modulated by the modulator 206 shown in FIGS. 2A-2D. In some embodiments, distribution of the data corresponding to the dRU onto the disjoint set of subcarriers included in the data portion 304 may be performed via the dRU tone mapper 208 shown in FIGS. 2A-2D. In some embodiments, duplication and or phase rotation of each the data portion 304 may be performed via the duplicator and phase rotator 210 shown in FIG. 2B or FIG. 2D.

According to the 802.11ax communication protocol, an extended range (ER) packet may be used to improve the range of an AP-STA link. In an embodiment, a limiting factor for a preamble in the 802.11ax communication protocol may be Carrier Sense (CS) detection, Signal Transform (ST) detection, and/or HE-SIGA decoding. In some embodiments, HE-SIGA decoding may be improved by repeating data symbols with different interleaving techniques. In addition, a Legacy-Long Training field (L-LTF) may be boosted by 3 dB to obtain an improved channel estimate. In one embodiment, a large sized RU may be considered but only a portion of the large sized RU may be used for transmission in a given data symbol. For example, in a PPDU with a 20 MHz signal bandwidth, according to the 802.11be communication protocol OFDMA tone plan, nine 26-subcarrier RUs may be present in the 20 MHz signal bandwidth. Thus, a payload may occupy a data symbol with nine 26-subcarrier RUs to improve the range of the AP-STA link, such that data symbols may be loaded onto each RU.

An example of a PPDU with symbols loaded onto RUs is described in further detail below with reference to FIG. 3C.

Figure 3C:
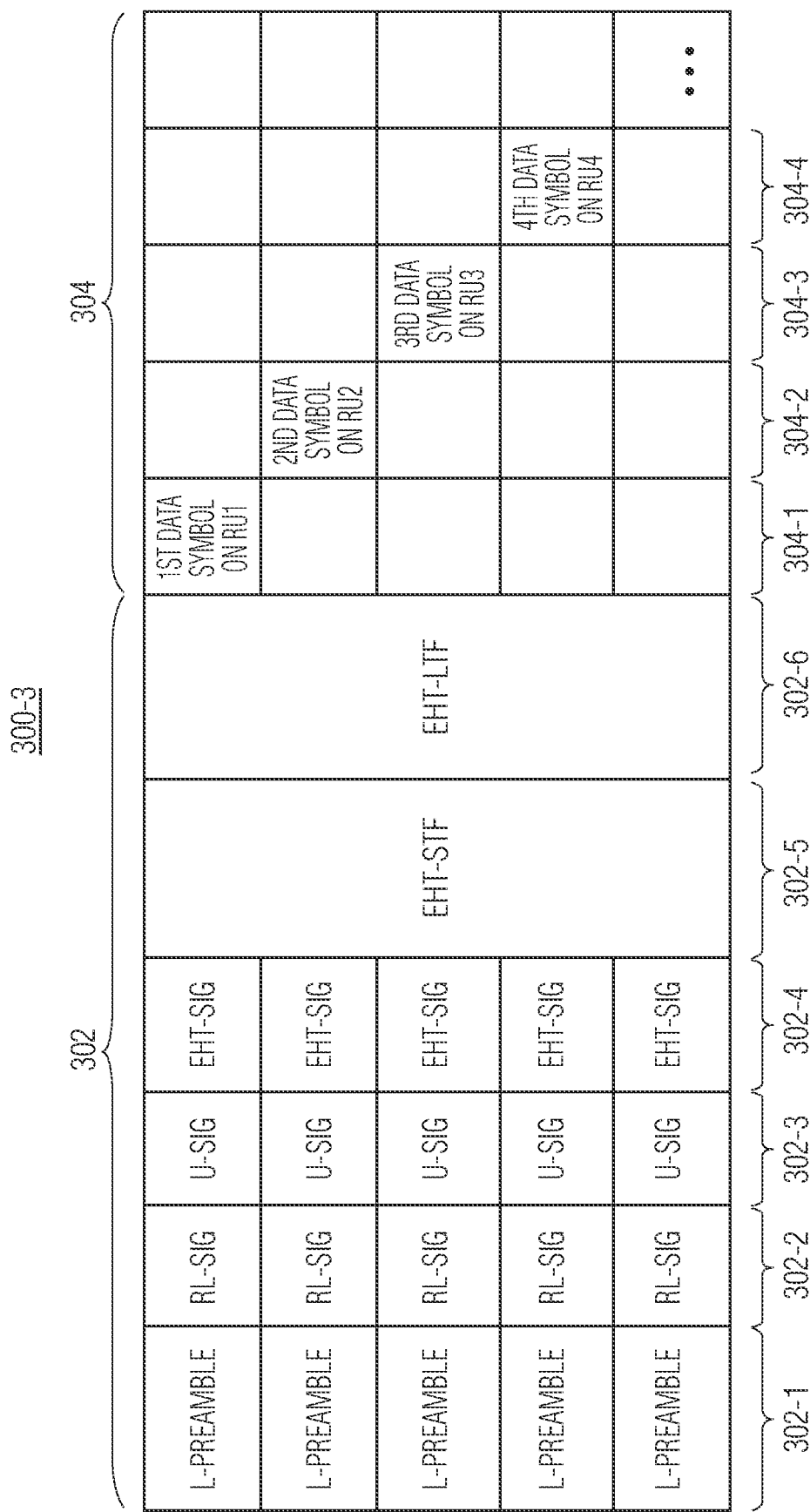
FIG. 3C depicts another example of a PPDU that may be transmitted by a wireless device in accordance with a PSD limit.

FIG. 3C depicts another example of a PPDU, 300-3, that may be transmitted by a wireless device in accordance with a PSD limit. In some embodiments, the PPDU 300-3 may be a PPDU for OFDMA transmissions and/or an EHT PPDU generated using the functional block diagram shown in FIGS. 2A-2D, such that the PPDU may be transmitted or solicited using OFDMA. In some embodiments, the PPDU 300-3 may include an RU (not shown) that is less than a signal bandwidth, such that data corresponding to the RU may be distributed onto a disjoint set of subcarriers (not shown). In some embodiments, the PPDU 300-3 includes data symbols loaded onto RUs and nine 26-subcarrier RUs (not shown) in a 20 MHz signal bandwidth, such that a payload occupies a data symbol with nine 26-subcarrier RUs. In some embodiments, a payload of one user is transmitted on different RUs via different data symbols included in the PPDU in a dispersed RU transmission. As an example, the payload may include a MAC header, information bits, padding, and a Frame Check Sequence (FCS). In particular, FIG. 3C depicts a 20 MHz preamble portion 302 and a data portion 304 that are each included in the PPDU 300-3. With reference to FIG. 3C, each row included in the 20 MHz preamble portion 302 may represent a 20 MHz channel of a signal bandwidth, such that the signal bandwidth may be, for example, 40 MHz, 80 MHz, 160 MHz, 320 MHz, or more than 320 MHz.

In an embodiment, the 20 MHz preamble portion 302 of the PPDU 300-1 includes four fields that are duplicated for each 20 MHz channel of the signal bandwidth and two fields that may be loaded onto a dRU. The six fields of the 20 MHz preamble portion 302 are implemented as a first field 302-1 (shown as including L-Preamble), a second field 302-2 (shown as including RL-SIG), a third field 302-3 (shown as including U-SIG), a fourth field 302-4 (shown as including EHT-SIG), a fifth field 302-5 (shown as including EHT-STF), and a sixth field 302-6 (shown as including EHT-LTF). In some embodiments, "duplicated" may imply that the contents (e.g., data, information, bits, etc.) of each field for a 20 MHz channel are duplicated across the signal bandwidth and/or are the same for each corresponding field in other 20 MHz channels of the PPDU. For example, the contents of the first field 302-1 (shown as L-Preamble) in a first 20 MHz channel (shown by the first row) of the PPDU 300-2 may be repeated and/or the same as the contents of the first field in a second 20 MHz channel (shown by the second row), a third 20 MHz channel (shown by the third row), a fourth 20 MHz channel (shown by the fourth row), and/or other 20 MHz channels (not shown) included in the signal bandwidth of the PPDU.

In an embodiment, the data portion 304 of the PPDU 300-3 may include data symbols loaded onto an RU. In such an embodiment, the data portion 304 includes four data symbols loaded onto corresponding RUs, implemented as a first data symbol 304-1 (shown as including $1^{st}$ Data symbol on RU1), a second data symbol 304-2 (shown as including $2^{nd}$ Data symbol on RU2), a third data symbol 304-3 (shown as including $3^{rd}$ Data symbol on RU3), and a fourth data symbol 304-4 (shown as including $4^{th}$ Data symbol on RU4). In such an embodiment, each data symbol loaded onto an RU (e.g., the first data symbol 304-1, the second data symbol 304-2, the third data symbol 304-3, and the fourth data symbol 304-4) of the data portion 304 may occupy a 20 MHz channel.

In addition, encoding each data symbol loaded onto an RU (e.g., the first data symbol 304-1, the second data symbol 304-2, the third data symbol 304-3, and the fourth data symbol 304-4) of the data portion 304 may distribute data corresponding to the RU onto the disjoint set of subcarriers across the signal bandwidth. For example, the data portion 304 of the PPDU 300-3 shown in FIG. 3C distributes data corresponding to the RU onto the disjoint set of subcarriers across a signal bandwidth of 80 MHz. In addition, in some embodiments, the data portion 304 may be modulated by the modulator 206 shown in FIGS. 2A-2D. In some embodiments, distribution of the data corresponding to the RU onto the disjoint set of subcarriers included in the data portion 304 may be performed via the dRU tone mapper 208 shown in FIG. 2A-2D.

With reference to FIG. 3C, in some embodiments, at least one user (e.g., AP or STA) may be assigned an RU size and an RU location for a corresponding user may move across different data symbols included in the data portion 304 of the PPDU 300-3. In such an embodiment, an RU may be defined similarly as specified in the 802.11ax communications protocol or the 802.11be communications protocol, such that the RU may be contiguous, scattered, or distributed. In an embodiment, the RU location for a corresponding user may move across different data symbols either after each data symbol or after each N data symbol, such that N may be an integer greater than zero. In an embodiment, the RU location for a corresponding user may move by shifting based on an RU index. In another embodiment, the RU location for a corresponding user may move by shifting by a N number of subcarriers, such that N may be an integer greater than zero. In some embodiments, each corresponding user's RU may travel within a signal bandwidth (e.g., entire PPDU bandwidth) or each corresponding user's RU may travel within a certain frequency range or larger RU. In such embodiments, transmissions may be intended for a single-user (SU) or for multiple users (MU) in an OFDMA transmission.

With further reference to FIG. 3C, the data portion 304 may include the payload that occupies the data symbol with nine 26-subcarrier RUs. In an embodiment, the payload occupies the data symbol of the PPDU with RUs for corresponding users in a dispersed RU transmission. As an example, a dispersed RU transmission may involve the transmission of a PPDU in which data corresponding to an RU has been distributed onto a disjoint set of subcarriers. In an embodiment, the payload may be generated for a 26-subcarrier RU, such that the first symbol may be loaded onto the first 26-subcarrier RU, while the second symbol is loaded onto the second 26-subcarrier RU, and so on in a round robin manner, i.e., 10th symbol is loaded onto the first 26-subcarrier RU. Such an RU may be referred to as a dispersed RU. By spreading the RU across different symbols, average spectrum similar to that of entire loaded 20 MHz may be achieved and power boosted performance may be similar to that of loading a single RU.

Additionally, pilots may be loaded in a pilot location of the corresponding 26-subcarrier RU. Alternatively, the entire 20 MHz signal bandwidth may be used by an SU transmission, such that the pilots may be loaded in symbols, resulting in additional gain in performance. For example, doubling the pilots from 4 to 8 results in a performance improvement of approximately 1 dB gain (i.e., considering 20 MHz and 26-subcarrier RU).

In some embodiments, initial bandwidth may be a SU bandwidth, a multi-RU (MRU) portion in an OFDMA transmission, or the like. Further, initial RU sizes may be a 26-subcarrier RU or a size other than the 26-subcarrier RU, e.g., 52/106/52+26/106+26/242/484/484+242/996. In an embodiment, 52+26 may be any adjacent 52+26 for simplicity. In another embodiment, a fixed sequence may be used, i.e., a predefined 52+26 sized RU in each data symbol. In an embodiment, RUs across symbols may not need to be the same size. In an embodiment, a 242 RU assignment may be across a signal bandwidth greater than 20 MHz, such that assignment may be similar for other larger sized RUs. Further, instead of changing the RU location every symbol, RU location may be changed across multiple symbols. In an embodiment, the RUs may be mapped to the existing RU tone map as defined by the 802.11be communication protocol tone plan.

In some embodiments, a new tone plan may be utilized. In an embodiment, placement of a small RU in a symbol may lead to a burst error if a particular portion of the bandwidth is in deep fade. Instead, the RU subcarriers within a symbol may be dispersed, such that a 242 sized RU may be divided into sub-RUs (e.g., nine 26 RUs where subcarriers in sub-RUs are adjacent). In an embodiment, symbols may be generated with a 26-subcarrier RU and the subcarriers may be spread across the entire bandwidth, i.e., a first symbol may have loaded subcarriers on a first data tone, a tenth data tone, a nineteenth data tone and so on. Similarly, symbol x may have loaded tones on a (mod(x−1, 9)+1)th data tone (i.e., S1 data tone), a (S1+9) data tone, and so on. Further, the RU size and bandwidth may not be limited to the 26-subcarrier RU and 20 MHz (242 sized RU) bandwidth portion, and RU location may change across multiple symbols.

In an embodiment, considerable performance gain may be achieved in an EHT portion of a PPDU. To improve preamble performance, the 802.11ax communication protocol-based ER preamble structure may be used. Further, power boost may be applied to the entire preamble portion to achieve greater performance benefits. In addition, the entire preamble may be duplicated across a 20 MHz portion, such that there may be preamble repetition. In an embodiment, this mode may be used for signal bandwidths greater than 20 MHz, and the RU shifting may be across the entire bandwidth. In such an embodiment, EHT-LTF may be available on all data tones, and may be power boosted to obtain a channel estimate performance gain. Further, EHT-LTF may be repeated to achieve noise reduction by averaging.

In some embodiments, when more than one user is scheduled within a packet, the total RU within a given bandwidth may be divided almost equally between the users, and the scheme of the present disclosure may be implemented within each partitioned RU. Instead of equal division, a user that needs higher performance may be allotted this mode, while the other user may be allocated a lesser partition and/or lower power which meets the PSD requirement. For example, consider a 242 sized RU in a 20 MHz bandwidth where two users are scheduled. In one embodiment, for the first user, the scheme of present disclosure may be applied in RU index 0-4, and for the second user, the scheme may be applied in RU index 5-8. In such an embodiment, both users may be loaded simultaneously, i.e., RU index 0 and RU index 5 may be loaded in symbol 1, and RU index 1 and RU index 8 may be loaded in symbol 2, and so on. In another embodiment, only one RU may be loaded in a given data symbol, i.e., RU index 'i' is loaded in symbol index (n %9==i) and RU index 'i' may belong to the first user or the second user. In another embodiment, for the first user, the scheme may be applied in RU index 0-x, and for the second user, the scheme may be applied in the remaining RU indices available.

In some embodiments, additional signaling may not be needed for the previously described technique. According to the 802.11ax communication protocol, an empty RU user information format may be used to indicate which RUs are used for transmission. In user-specific content, for an empty RU, station ID may need to be 2046, and the other fields may be reserved. In an embodiment, the reserved bits may indicate the station ID of the user for which repetition is employed and other modes such as loading both users on every symbol or one user on one symbol.

According to the 802.11be communication protocol, if an empty RU indication is the same as specified by the 802.11ax communication protocol, the same format may be applied or a new signaling format may be applied where special user-specific content is defined for a corresponding mode which lists the station ID to be loaded in a RU in the particular RU distribution format for an empty RU. For example, consider two users and a 20 MHz signal bandwidth. In such an example, RU0-4 may be associated with the first user, and RU5-8 may be associated with the second user. Further, RU0 and RU5 may include the content of the first and second users, followed by station ID which may be used in RU1-4, and RU 6-8, respectively. The additional fields may be grouped into 42-bits, and each 42-bit group may include a 4-bit Cyclic Redundancy Check (CRC) and 6 tail bits.

In an alternate embodiment, a large sized RU may be considered but only a portion of the large sized RU may be used for transmission in any given data symbol. For example, consider a 242 sized RU in a 20 MHz bandwidth. According to the 802.11be communication protocol OFDMA tone plan, nine 26-subcarrier RUs may be present in a 20 MHz bandwidth. In such an embodiment, the symbols may be loaded similar to a regular OFDMA packet. In an embodiment, subcarriers at IFFT input may be shifted for each symbol, such that the subcarrier shift may be fixed irrespective of RUs loaded or the number of RUs loaded. In some embodiments, RUs may be dynamically selected at a transmitter and the dynamic selection may use RU size loaded and the number of RUs loaded, such that dynamic selection may be replicated at a receiver. Further, dynamic selection may be signaled through a preamble portion over a set of fixed subcarrier shifts available for use.

In some embodiments, subcarrier shifts may be exclusively within the subcarriers used when a fully loaded SU transmission or a fully loaded MRU transmission is used, i.e., no subcarrier outside an SU transmission or an MRU transmission may be used. In such an embodiment, subcarriers may be maintained by considering non-zero subcarriers in the SU transmission or the MRU transmission, and circularly shift loaded subcarriers across symbols with a specified subcarrier shift value. In some embodiments, pilot tones may also shift according to the same subcarrier shift value.

In some embodiments, an RU across a signal bandwidth may be partitioned across users, and a dispersed RU with subcarrier shift may be applied within each partitioned portion for a corresponding user. Similar to the dispersed RU scheme previously described for multiple users, user data of each user may be present in a data symbol or user data of one user may be loaded in one symbol. In some embodiments, an initial loaded RU may not need to have contiguous subcarriers loaded. In such an embodiment, contiguous subcarriers may be dispersed across a signal bandwidth, and a subcarrier shift may further be applied to non-contiguous subcarrier loading.

Example of techniques for encoding data portions of PPDUs using a disjoint set of subcarriers that may be transmitted by a wireless device are described in further detail below with reference to FIG. 4 and FIG. 5.

Figure 4:
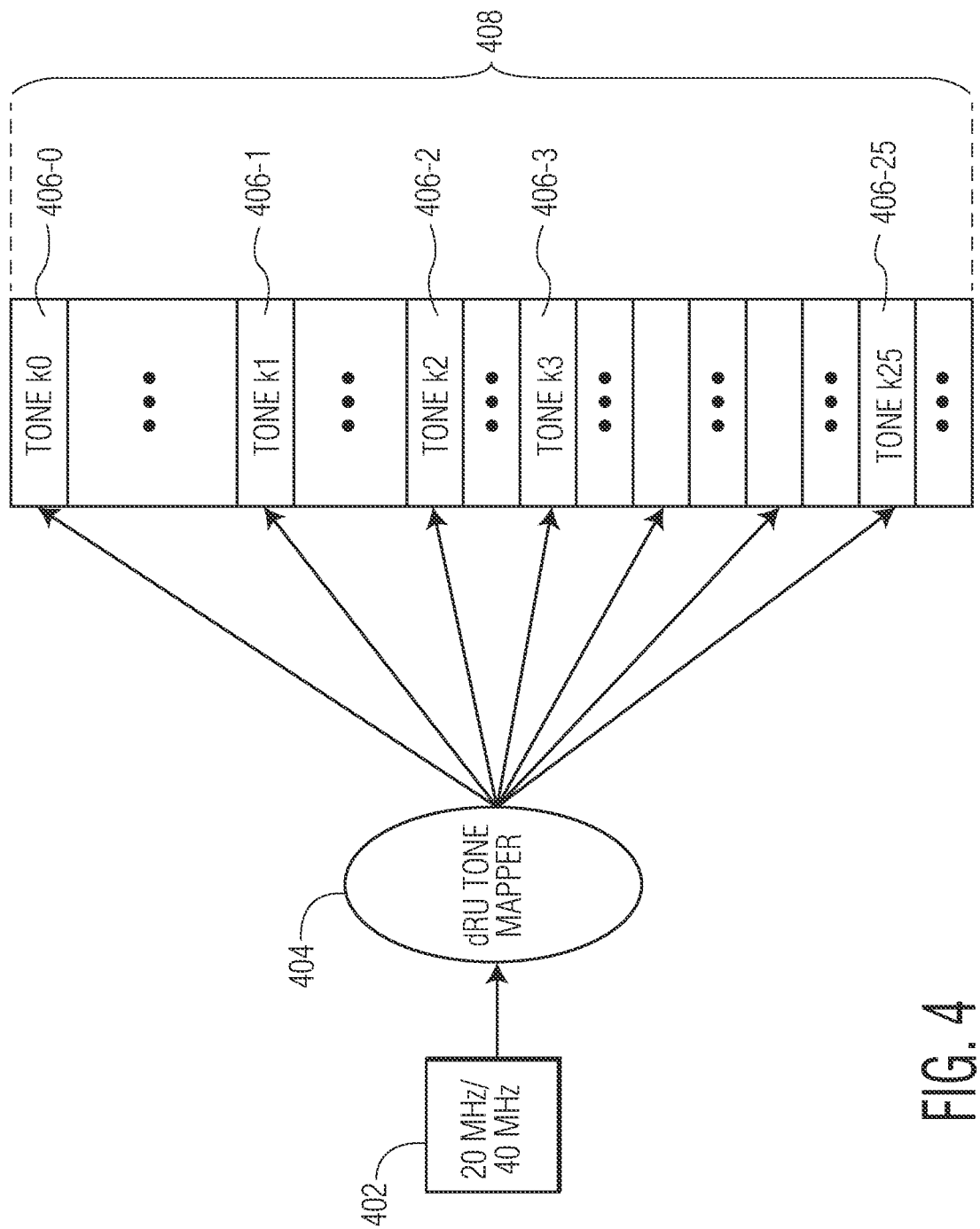
FIG. 4 illustrates a technique for encoding a data portion of a PPDU using a disjoint set of subcarriers that may be transmitted by a wireless device in accordance with a PSD limit for non-OFDMA transmissions.

FIG. 4 illustrates a technique for encoding a data portion of a PPDU using a disjoint set of subcarriers that may be transmitted by a wireless device in accordance with a PSD limit for non-OFDMA transmissions. In some embodiments, the data portion may be the data portion 304 included in PPDU 300-1 or PPDU 300-2 as shown in FIG. 3A or FIG. 3B, respectively. With reference to FIG. 4, the data portion (e.g., data portion 304) of the PPDU (e.g., PPDU 300-1 or PPDU 300-2) may be encoded and modulated using an encoding bandwidth 402, such that a dRU tone mapper 404 may distribute data corresponding to a first bandwidth onto a disjoint set of subcarriers 408 across a second (wider) signal bandwidth (not shown). In particular, FIG. 4 illustrates the technique for encoding the data portion of the PPDU as first defining the encoding bandwidth 402 to be 20 MHz or 40 MHz. Using the encoding bandwidth 402, the dRU tone mapper 404 distributes data corresponding to the 20 MHz (or 40 MHz) encoding bandwidth onto disjoint even subcarriers (e.g., Tone k0 406-0, Tone k1 406-1, Tone k2 406-2, Tone k3 406-3, and/or Tone k25 406-25) within a set of subcarriers 408 across the signal bandwidth. As an example, the signal bandwidth may be 40 MHz, 80 MHz, 160 MHz, 320 MHz, or more than 320 MHz. In addition, in some embodiments, the dRU tone mapper 404 may be the dRU tone mapper 208 as shown in FIGS. 2A-2D.

With reference to FIG. 4, the encoding bandwidth 402 may be 20 MHz and the signal bandwidth may be 40 MHz. In an embodiment, the dRU tone mapper 404 may distribute 234 data subcarriers to half of 468 available subcarriers included in the 40 MHz signal bandwidth, such that signals on the 234 subcarriers may be distributed onto two 242 RUs. As an example, data corresponding to the encoding bandwidth may be distributed onto even subcarriers of two 242 RUs via a round robin distribution. In an embodiment, round robin distribution may involve dividing subcarriers included in a signal bandwidth into subcarrier sets and distributing subcarriers onto each subcarrier set in a sequential manner. For example, if there are four subcarriers to be distributed and the signal bandwidth has been divided into four subcarrier sets, then the first subcarrier may be distributed onto each subcarrier set. After the first subcarrier has been distributed onto each subcarrier set, the second subcarrier may be distributed onto each subcarrier set. After the second subcarrier has been distributed onto each subcarrier set, the third subcarrier may be distributed onto each subcarrier set. After the third subcarrier has been distributed onto each subcarrier set, the fourth subcarrier may be distributed onto each subcarrier set. In other embodiments, round robin distribution may involve distributing different amounts of subcarriers and dividing the signal bandwidth into different amounts of subcarrier sets using a similar technique as previously described.

With further reference to FIG. 4, the encoding bandwidth 402 may be 40 MHz and the signal bandwidth may be at least 80 MHz. In an embodiment, an EHT OFDMA subcarrier map for each 80 MHz segment included in the data portion of the PPDU may include a duplicated 40 MHz segment, such that data corresponding to the RU may be encoded using a 484 RU (40 MHz) which may be distributed onto each 484 RU of the signal bandwidth. For example, if the signal bandwidth is 80 MHz, then the dRU tone mapper 404 may distribute data corresponding to the RU alternatively onto even subcarriers of the two 484 RUs included in the 80 MHz signal bandwidth. In such an example, distributing data corresponding to the RU alternatively onto even subcarriers of the two 484 RUs may involve distributing a subcarrier onto a first 484 RU, then onto a second 484 RU, and repeating said distribution process for each subcarrier that is to be distributed onto the two 484 RUs. As another example, if the signal bandwidth is 160 MHz, then the dRU tone mapper 404 may distribute data corresponding to the RU onto even subcarriers of the four 484 RUs included in the 160 MHz signal bandwidth via a round robin distribution.

Figure 5:
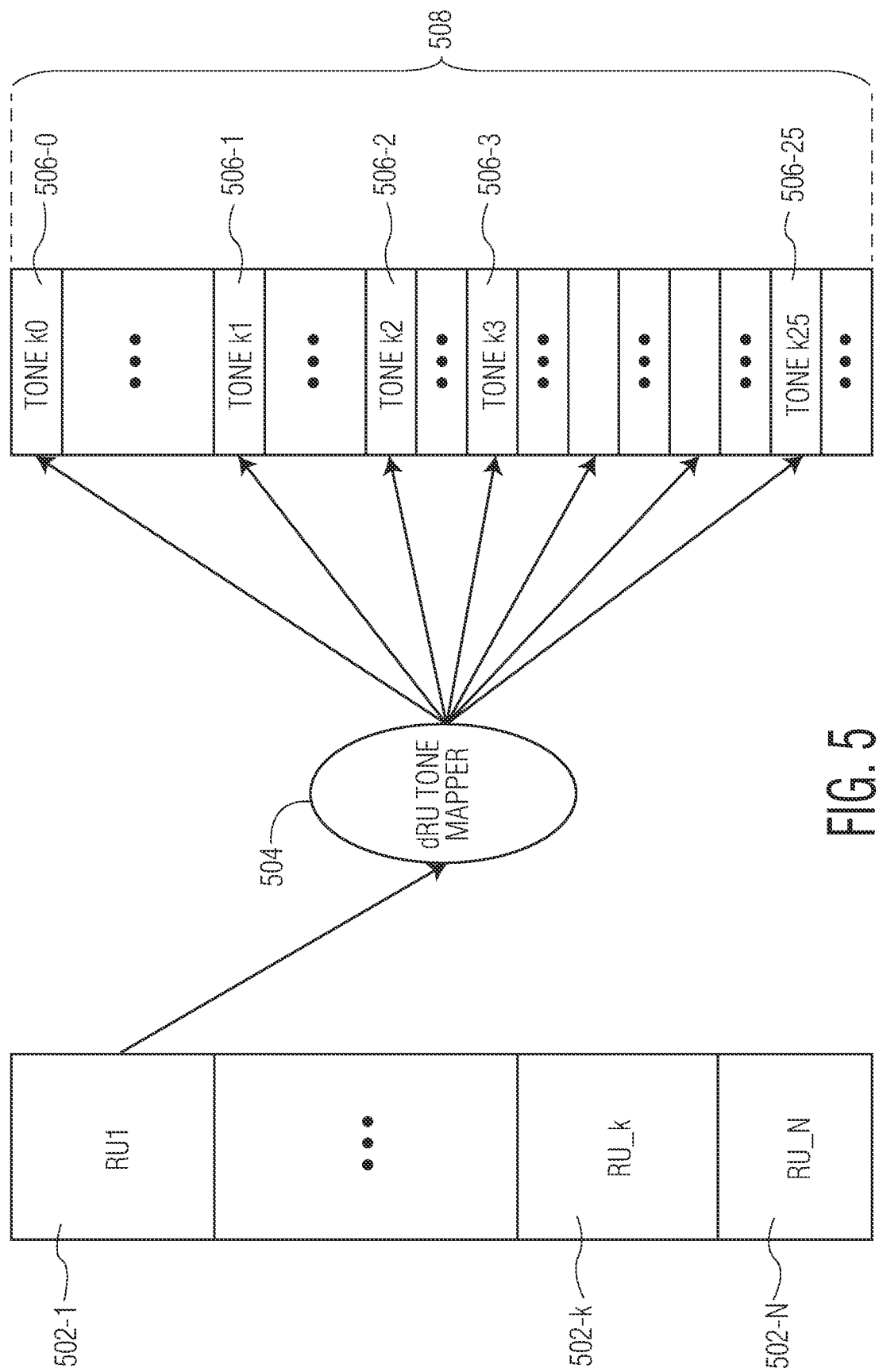
FIG. 5 illustrates another technique for encoding a data portion of a PPDU using a disjoint set of subcarriers that may be transmitted by a wireless device in accordance with a PSD limit for OFDMA transmissions.

FIG. 5 illustrates another technique for encoding a data portion of a PPDU using a disjoint set of subcarriers that may be transmitted by a wireless device in accordance with a PSD limit for OFDMA transmissions. In some embodiments, the data portion may be the data portion 304 included in PPDU 300-1 or PPDU 300-2 as shown in FIG. 3A or FIG. 3B, respectively. With reference to FIG. 5, the data portion (e.g., data portion 304) of the PPDU (e.g., PPDU 300-1 or PPDU 300-2) may be encoded and modulated using a regular RU, and loaded onto a dRU within a frequency unit (not shown) across a signal bandwidth (not shown) via a dRU tone mapper. In some embodiments, the frequency unit may be 20 MHz, 40 MHz, or 80 MHz and the signal bandwidth may be 40 MHz, 80 MHz, 160 MHz, 320 MHz, or more than 320 MHz.

In an embodiment, a dRU may be defined as a set of distributed subcarriers within a frequency unit, such that data corresponding to the dRU may be encoded and modulated as one regular RU (e.g., RU1 502-1 and optionally RU_k 502-k and/or RUN 502-N, where "k" is an integer greater than 1 and "N" is an integer greater than k). In particular, FIG. 5 illustrates the technique for encoding the data portion of the PPDU as first encoding and modulating data for each dRU as one RU (e.g., RU1 502-1, RU_k 502-k, and RUN 502-N). Using the RU (e.g., RU1 502-1), the dRU tone mapper 504 distributes data corresponding to the RU (e.g., RU1 502-1) onto a disjoint set of subcarriers 508 included in a frequency unit of the signal bandwidth. In an embodiment, data corresponding to RU1 502-1 may be distributed onto subcarriers (e.g., Tone k0 506-0, Tone k1 506-1, Tone k2 506-2, Tone k3 506-3, and/or Tone k25 506-25) included in the disjoint set of subcarriers 508.

With reference to FIG. 5, the distance between two subcarriers (e.g., Tone k0 506-0 and Tone k1 506-1) included in the disjoint set of subcarriers 508 may be thirteen subcarriers (1 MHz) to maximize transmission power. In addition, in some embodiments, the dRU tone mapper 504 may be the dRU tone mapper 208 as shown in FIGS. 2A-2D and may be designed to distribute encoded and modulated RU data onto a physical tone set. Furthermore, the technique illustrated by FIG. 5 may also be applied to PPDUs transmitted in up-link (UL) transmissions and down-link (DL) transmissions.

In one embodiment, a frequency unit of a dRU may be 20 MHz, such that each 20 MHz segment of a signal bandwidth may include nine 26-subcarrier dRUs. To ease implementation for wireless devices operating according to the EHT communication protocol, RU size (e.g., the amount of subcarriers included in an RU) and encoding schemes as specified by the 802.11ax communication protocol may be reused and applied to each 26-subcarrier dRU. In an embodiment, a 52 RU may be defined as two 26-subcarrier dRUs. In some embodiments, each of the 26-subcarriers included in the dRU may be nine subcarriers apart. In addition, using nine 26-subcarrier dRUs may accommodate 20 MHz-operating STAs in OFDMA transmissions.

In another embodiment, a frequency unit of a dRU may be 20 MHz, such that each 20 MHz of a signal bandwidth may include thirteen 18-subcarrier dRUs. In such an embodiments, each of the 18-subcarriers included in the dRU may be thirteen subcarriers apart. However, using thirteen 18-subcarrier dRUs may involve defining a new set of small RUs, e.g., dRU18, dRU36, dRU72, dRU144, etc. In an embodiment, using thirteen 18-subcarrier dRUs may accommodate 20 MHz-only STAs in OFDMA transmissions.

In one embodiment, a frequency unit of a dRU may be 40 MHz, such that a signal bandwidth may include a base dRU that is either 26-subcarrier dRUs that span 40 MHz or thirteen 18-subcarrier dRUs that are each thirteen subcarriers apart and that span within 20 MHz. In such an embodiment, the eighteen 26-subcarrier dRUs or the twenty-six 18-subcarrier dRUs may be defined as the smallest dRU size and the base dRU size may be defined as one set of dRUs from each 20 MHz frequency unit, such that the base dRU covers 40 MHz. As an example, a 52-subcarrier RU may be defined as [dRU26−128, dRU26+128]. As another example, a 36-subcarrier RU may be defined as [dRU18−128, dRU18+128].

In one embodiment, a frequency unit of a dRU may be 80 MHz, such that a signal bandwidth may include dRUs that span each 80 MHz included in the signal bandwidth. In such embodiment, the dRU sizes can be the same as regular RU sizes as specified in the 802.11ax communications protocol or the 802.11be communications protocol such as, e.g., 26-subcarrier RU, 52-subcarrier RU, 106-subcarrier RU, 242-subcarrier RU, 484-subcarrier RU, etc.

In some embodiments, to achieve longer PPDU transmission range, a base dRU may be duplicated across frequency units included in the signal bandwidth and a range extension preamble may be used. As an example, the base dRU may be defined as nine 26-subcarrier dRUs or thirteen 18-subcarrier dRUs in a 20 MHz frequency unit. In such an example, the base dRU may be duplicated across at least two 20 MHz frequency units included in the signal bandwidth using a Dual Carrier Modulation (DCM), a Quadrature Carrier Modulation (QCM), or a phase change. As another example, the base dRU may be defined as one set of dRUs from each 20 MHz frequency unit, such that the base dRU covers 40 MHz. In such an example, the base dRU may be duplicated across at least two 40 MHz frequency units included in the signal bandwidth using the DCM, the QCM, or the phase change. In such examples, duplication of the base dRU using the DCM, the QCM, or the phase change may be implemented to improve peak-to-average power ratio (PAPR). In addition, duplication of the base dRU in either example may be performed by duplicator and phase rotator 210 as shown in FIG. 2B or FIG. 2D. Furthermore, duplicating the base dRU across frequency units included in the signal bandwidth achieves greater transmission power using the same data rate.

In some embodiments, a distributed RU may be defined by reusing an existing RU size and encoding technique as specified in the 802.11be communication protocol. As an example, a distributed RU may be defined as an RU (e.g., RU1 502-1 shown in FIG. 5) in which subcarriers of the RU have been distributed onto a disjoint set of subcarriers (e.g., disjoint set of subcarriers 508). However, instead of contiguous subcarrier mapping, distributed subcarrier sets may be used to distribute encoded and modulated data corresponding to an RU. In some embodiments, a number of subcarriers included in a dRU may be the same as the number of subcarriers included in a corresponding regular RU. In an embodiment, for UL OFDMA transmissions, a trigger frame may be transmitted to STAs to trigger transmission for a requested RU. Considering wider bandwidths (e.g., 320 MHz or greater than 320 MHz) may be used by wireless devices operating in accordance with at least one non-legacy communication protocol, different frequency units may use a regular RU or a distributed RU. Thus, a new signaling technique may be needed to signal whether a requested RU is a regular RU or a distributed RU. In some embodiments, for UL triggered transmission, whether the RU is a regular RU or a distributed RU may be signaled by an RU type bit included in a trigger frame.

An example of User Info field included in a MAC frame that may be used to signal whether a requested RU is a regular RU or a distributed RU is described in further detail below with reference to FIG. 6.

Figure 6:
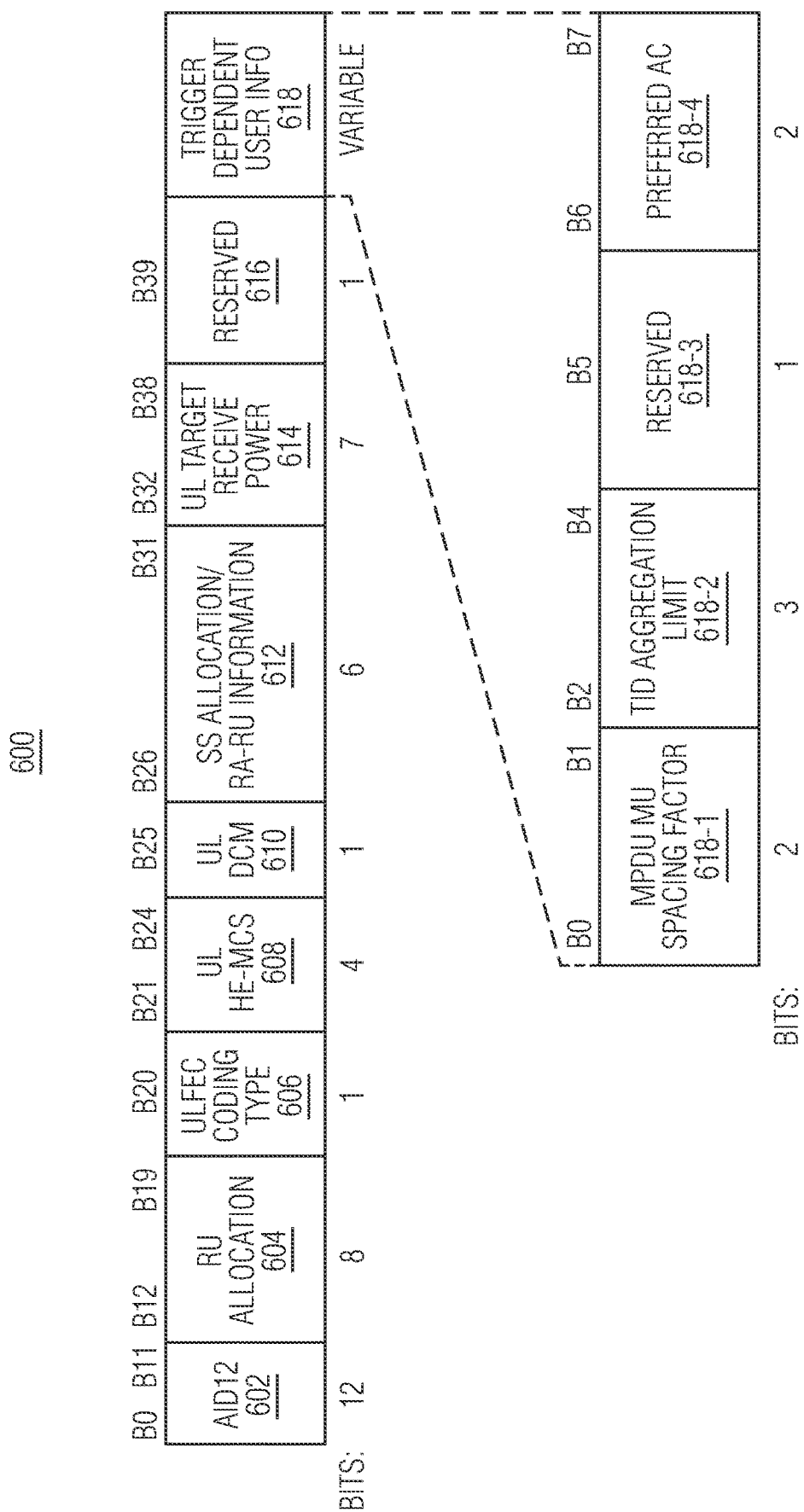
FIG. 6 depicts an example of a User Info field in a Media Access Control (MAC) frame triggering up-link (UL) transmissions that may be used to signal whether a requested RU is a regular RU or a distributed RU.

FIG. 6 depicts an example of a User Info field, 600, in a MAC frame triggering UL transmissions that may be used to signal whether a requested RU is a regular RU or a distributed RU. In some embodiments, the User Info field 600 may be included in a MAC frame (not shown) (e.g., a trigger frame) transmitted by a wireless device. With reference to FIG. 6, the User Info field 600 is shown as including an AID12 field 602 that is bits B0 to B11 (12-bits), an RU Allocation field 604 that is bits B12 to B19 (8-bits), an Uplink Forward Error Correction (ULFEC) Coding Type field 606 that is bit B20 (1-bit), a UL High-Efficiency (HE) Modulation and Coding Scheme (MCS) field 608 that is bits B21 to B24 (4-bits), a UL DCM field 610 that is bit B25 (1-bit), a Space Stream (SS) Allocation/Resource Allocation (RA)-RU Information field 612 that is bits B26 to B31 (6-bits), a UL Target Receive Power field 614 that is bits B32 to B38 (7-bits), a Reserved field 616 that is bit B39 (1-bit) and a Trigger Dependent User Info field 618 that is a variable number of bits and includes four subfields. In an embodiment, the Trigger Dependent User Info field 618 includes four subfields, implemented as a MAC Protocol Data Unit (MPDU) MU Spacing Factor subfield 618-1 that is bits B0 to B1 (2-bits), a Traffic Identifier (TID) Aggregation Limit subfield 618-2 that is bits B2 to B4 (3-bits), a Reserved subfield 618-3 that is B5 (1-bit), and a Preferred Access Class (AC) subfield 618-4 that is B6 to B7 (2-bits).

With reference to FIG. 6, the User Info field 600 may be used to signal whether a requested RU is a regular RU or a distributed RU by adding one bit (e.g., an RU type bit) to indicate the requested RU. In one embodiment, the RU type bit may be bit B39 of the Reserved field 616. In another embodiment, the RU type bit may be bit B5 of the Reserved subfield 618-3 included in the Trigger Dependent User Info field 618. As an example, setting bit B39 of the Reserved field 616 or bit B5 of the Reserved subfield 618-3 to "1" may signal that the requested RU is a regular RU. As another example, setting bit B39 of the Reserved field 616 or bit B5 of the Reserved subfield 618-3 to "1" may signal that the requested RU is a distributed RU. In some embodiments, either of the examples may also set the bit to "0" to signal that the requested RU is a regular RU or a distributed RU.

An example of Common Info field included in a MAC frame that may be used to signal whether a requested RU is a regular RU or a distributed RU is described in further detail below with reference to FIG. 7.

FIG. 7 depicts an example of a Common Info field, 700, that may be used to signal whether a requested RU is a regular RU or a distributed RU. In some embodiments, the Common Info field 700 may be included in a MAC frame (not shown) (e.g., a trigger frame) transmitted by a wireless device. With reference to FIG. 7, the Common Info field 700 is shown as including a Trigger Type field 702 that is bits B0 to B3 (4-bits), a UL Length field 704 that is bits B4 to B15 (12-bits), a More Trigger Frame (TF) field 706 that is bit B16 (1-bit), a CS Required field 708 that is bit B17 (1-bit), a UL Bandwidth (BW) field 710 that is bits B18 to B19 (2-bits), a Guard Interval (GI) and HE-LTF Type Transmission Opportunity (TXOP) Sharing Mode field 712 that is bits B20 to B21 (2-bits), an MU Multiple-Input Multiple-Output (MU-MIMO) HE-LTF Mode field 714 that is bit B22 (1-bit), a Number of HE-LTF Symbols and Midamble Periodicity field 716 that is bits B23 to B25 (3-bits), a UL Space-Time Block Coding (STBC) field 718 that is bit B26 (1-bit), a Low-Density Parity Check (LDPC) Extra Symbol Segment field 720 that is bit B27 (1-bit), an AP Transmission (Tx) Power field 722 that is bits B28 to B33 (6-bits), a Pre-Forward Error Correction (FEC) Padding Factor field 724 that is bits B34 to B35 (2-bits), a Packet Extension (PE) Disambiguity field 726 that is bit B36 (1-bit), a UL Spatial Reuse field 728 that is bits B37 to B52 (16-bits), a Doppler field 730 that is bit B53 (1-bit), a UL HE-SIG-A2 Reserved field 732 that is bits B54 to B62 (9-bits), a Reserved field 734 that is bit B63 (1-bit), a Trigger Dependent Common Info field 736 that is a variable number of bits and a Special User Info field 738.

With reference to FIG. 7, a bit (e.g., an RU type bit) included in the Common Info field 700 may be used to signal whether a requested RU is a regular RU or a distributed RU. In an embodiment, the RU type bit may be one bit to the Common Info field 700 to signal whether a requested transmission may be using a regular RU format or a distributed RU format for a signal bandwidth. In an embodiment, the RU type bit may be one bit that indicates whether each RU is a regular RU or a distributed RU. In an embodiment, the RU type bit may be N bits added to the Common Info field 700 to indicate each frequency unit's RU type (e.g., regular RU or distributed RU). In some embodiments, N bits may be a bitmap, such that each bit in the bitmap may indicate the RU type of a corresponding frequency unit. In some embodiments, N bits may be signaled in bits included in the HE-SIGA2 Reserved field 732 or the Special Aid User Info field 738 included in the Common Info field 700. As an example, when N=16-bits, N may signal each 20 MHz frequency unit's RU type (up to a signal bandwidth of 320 MHz). As another example, when N=4-bits, N may signal each 80 MHz frequency unit's RU type (up to a signal bandwidth of 320 MHz). As another example, when N=4-bits, N may signal the RU type of each one fourth of a signal bandwidth. In such an example, for a signal bandwidth of 320 MHz or 80 MHz, N signals each 80 MHz or 20 MHz frequency unit's RU type, respectively. As another example, when N=8-bits, N may signal the RU type of each one eighth of a signal bandwidth.

In another embodiment, to spread small bandwidth RUs over a larger bandwidth, a Global Distributed tone mapping ($D_{TM}$) subcarrier distribution style may be used, such that the Global $D_{TM}$ subcarrier distribution may be similar to a Low-Density Parity Check (LDPC) tone mapper design. In an embodiment, data corresponding to an RU may be distributed onto a disjoint set of subcarriers using the Global $D_{TM}$ subcarrier distribution style that maps pilot tones for the RU size onto even number subcarriers. The Global $D_{TM}$ subcarrier distribution may be advantageous as Global $D_{TM}$ subcarrier distribution guarantees that neighboring subcarriers for 26-subcarrier RUs will be 1 MHz apart and that neighboring subcarriers for 52-subcarrier RUs will be 1 MHz apart if spread over 80 MHz. In addition, Global $D_{TM}$ subcarrier distribution allows for simple subcarrier mapping between a logical RU and a distributed RU.

However, current Global $D_{TM}$ subcarrier distribution may experience issues with pilot tones after mapping because some pilot tones may be mapped close to each other for large size RUs due to wraparound that may occur during tone mapping. For example, mapped logical tones for a $4^{th}$ 242-subcarrier RU may be [−475 −346 −243 76 179 308 411 414], and mapped logical pilot tones for a $1^{st}$ 484-subcarrier RU may be [−459−456−422−342−314−234−200−198−118−84 29 145 209 325 433 467], such that pilot tones may only two or three subcarriers apart between the $4^{th}$ 242-subcarrier RU and the $1^{st}$ 484-subcarrier RU. Consequently, when pilot tones are close to each other it may affect phase tracking and/or carrier frequency offset (CFO) tracking due to a lack of frequency diversity. In addition, some pilot tones may become odd numbered subcarriers after mapping, which means that only EHT-LTF 4× mode may be used for distributed RU transmission.

In some embodiments, to address pilot tone issues associated with the Global $D_{TM}$ subcarrier distribution tone plan, mapped logical pilot tones may be replaced with new pilot tones. In such an embodiment, new pilot tones may be used for applicable RU sizes, e.g., 26, 52, 78, 106, 132, 242 and 484, and may be guaranteed to be 1 MHz (i.e., 13-subcarriers) apart. In addition, new pilot tones may be even numbered subcarriers if EHT-LTF 2× mode is allowed in a 6 GHz LPI transmission. In some embodiments, mapped logical pilot tones may be selected if the mapped logical pilot tones satisfy conditions that may be needed for the new pilot tones.

In some embodiments, new pilot tones may first be assigned for each 26-subcarrier distributed RU and used for larger size RUs as specified by a logical RU pilot tone design. In such an embodiment, if EHT-LTF 2× mode is allowed in 6 GHz LPI transmission, for an ith 26-subcarrier distributed RU, confirmation of each mapped logical pilot tone as an even numbered subcarrier may be checked. If a mapped logical pilot tone is an odd numbered subcarrier, a neighboring even numbered distributed data subcarrier may be assigned as the new pilot tone for the given RU. In an embodiment, a mapped logical pilot tone may be used as a data subcarrier in the distributed 26-subcarrier RU. In some embodiments, for a mapped logical pilot tone not assigned to larger size RUs, the mapped logical pilot tone may be directly selected as the new pilot tone for the ith 26-subcarrier distributed RU. For a mapped logical pilot tone assigned to both a 26-subcarrier RU and larger sized RUs, confirmation may be needed to check that the mapped logical pilot tone is at least 1 MHz apart from new pilot tones assigned to each relevant larger size RUs. In such an embodiment, if the distance between the mapped logical pilot tone and the new pilot tone is less than 1 MHz apart, then a qualifying distributed data subcarrier may be assigned as the new pilot tone for the ith 26-subcarrier distributed RU. In an embodiment, the mapped logical pilot tone may be used as a data subcarrier in the distributed 26-subcarrier RU. In some embodiments, for an RU size greater than 26, new pilot tones may be chosen from pilot tones assigned in corresponding 26-subcarrier RUs.

Examples of distributed pilot tones in accordance with Global $D_{TM}$ subcarrier distribution are described in further detail below with reference to FIGS. 8A-8C.

Figure 8A:
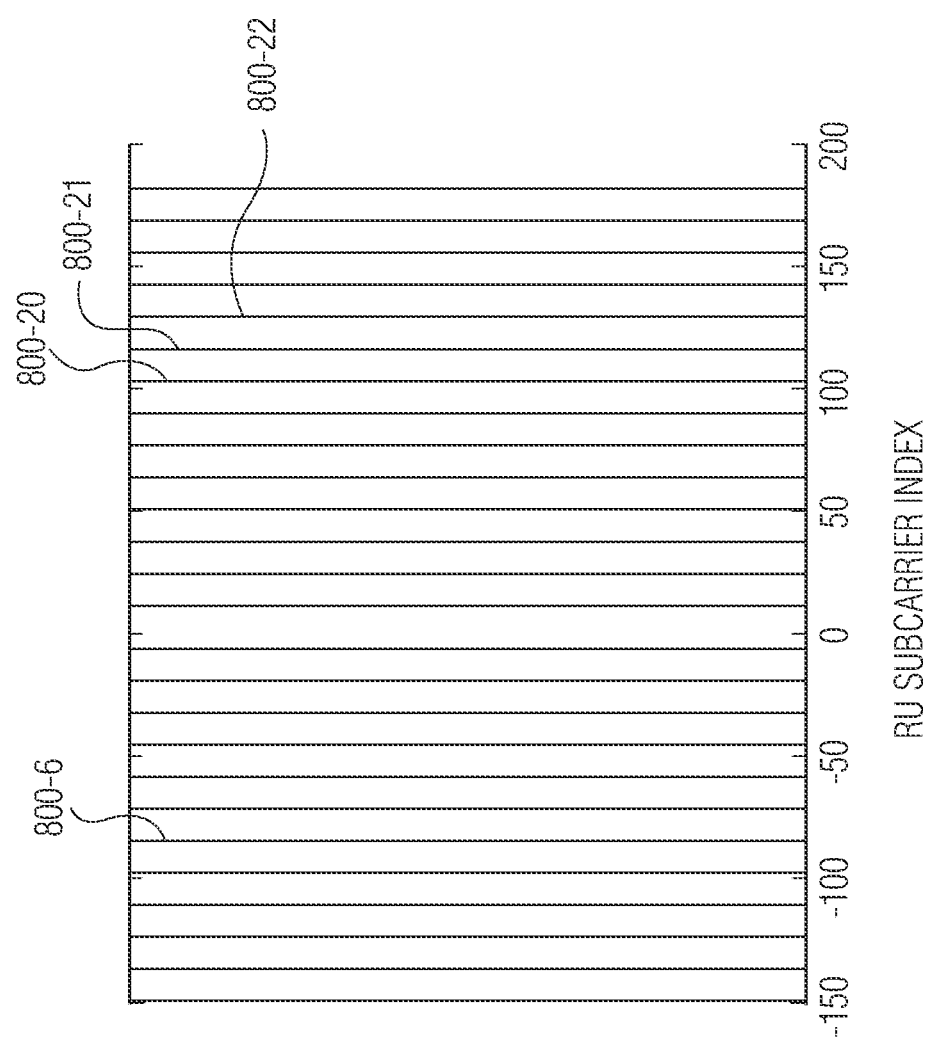
FIG. 8A depicts an example of distributed pilot tones in accordance with Global Distributed tone mapping ($D_{TM}$) subcarrier distribution.

FIG. 8A depicts an example of distributed pilot tones in accordance with Global $D_{TM}$ subcarrier distribution. With reference to FIG. 8A, RU Subcarrier Indices are shown for a 26-subcarrier RU, such that each line represents a corresponding subcarrier. In particular, FIG. 8A depicts mapped logical pilot tones within a 26-subcarrier RU, implemented as $6^{th}$ subcarrier 800-6 and $20^{th}$ subcarrier 800-20 within the 26-subcarrier RU. In addition, new distributed pilot tones may be implemented as the $6^{th}$ subcarrier 800-6 and $21^{st}$ subcarrier 800-21, such that one mapped logical pilot tone ($6^{th}$ subcarrier 800-6) may be chosen as a distributed pilot tone. However, the $21^{st}$ subcarrier 800-21 is an odd numbered subcarrier (e.g., subcarrier index 103 in 80 MHz tone plan) and may be replaced with a neighboring distributed data subcarrier so that a new pilot tone may be an even numbered subcarrier. In such an embodiment, the new pilot tone may be $22^{nd}$ subcarrier 800-22 with a subcarrier index of 116 in 80 MHz tone plan. In some embodiments, FIG. 8A depicts a $2^{nd}$ 26-subcarrier RU mapped to 80 MHz with a spreading factor $D_{TM}$ equal to 13.

Figure 8B:
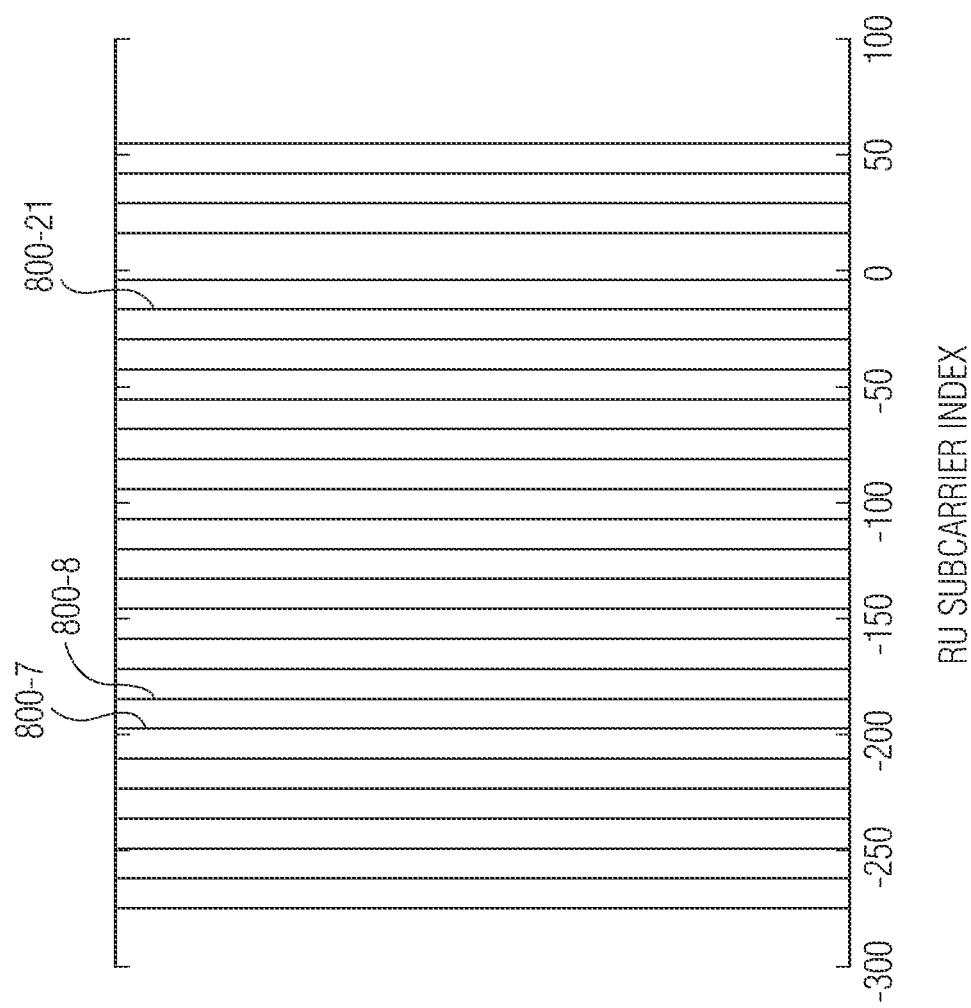
FIG. 8B depicts another example of distributed pilot tones in accordance with Global $D_{TM}$ subcarrier distribution.

FIG. 8B depicts another example of distributed pilot tones in accordance with Global $D_{TM}$ subcarrier distribution. With reference to FIG. 8B, RU Subcarrier Indices are shown for a 26-subcarrier RU, such that each line represents a corresponding subcarrier. In particular, FIG. 8B depicts mapped logical pilot tones within a 26-subcarrier RU, implemented as $7^{th}$ subcarrier 800-7 and $21^{st}$ subcarrier 800-21 within the 26-subcarrier RU. In addition, new distributed pilot tones may be $8^{th}$ subcarrier 800-8 and the $21^{st}$ subcarrier 800-21, such that one mapped logical pilot tone ($21^{st}$ subcarrier 800-21) may be chosen as a distributed pilot tone. However, the $7^{th}$ subcarrier 800-7 is an odd numbered subcarrier (e.g., subcarrier index −198 in 80 MHz tone plan) and only two subcarriers apart from another chosen distributed pilot tone within the same 484-subcarrier RU (subcarrier index −200 may be one of the distributed pilot tones selected for the same 484-subcarrier RU), and may be replaced with a neighboring distributed data subcarrier so that new pilot tones for applicable sized distributed RUs may be at least 1 MHz apart. In such an embodiment, the new pilot tone may be $8^{th}$ subcarrier 800-8 with a subcarrier index of −185 in 80 MHz tone plan. In some embodiments, FIG. 8B depicts a $10^{th}$ 26-subcarrier RU mapped to 80 MHz with a spreading factor $D_{TM}$ equal to 13.

FIG. 8C depicts another example of distributed pilot tones in accordance with Global $D_{TM}$ subcarrier distribution. With reference to FIG. 8C, RU Subcarrier Indices are shown for a 26-subcarrier RU, such that each line represents a corresponding subcarrier. In particular, FIG. 8C depicts mapped logical pilot tones within a 26-subcarrier RU, implemented as $7^{th}$ subcarrier 800-7 and $21^{st}$ subcarrier 800-21 within the 26-subcarrier RU. In addition, new distributed pilot tones may be the $7^{th}$ subcarrier 800-7 and 23' subcarrier 800-23, such that one mapped logical pilot tone ($7^{th}$ subcarrier 800-7) may be chosen as a distributed pilot tone. However, the $21^{st}$ subcarrier 800-21 (e.g., subcarrier index 414 in 80 MHz tone plan) is only three subcarriers apart from another chosen distributed pilot tone within the same 484-subcarrier RU (subcarrier index 411 may be one of the distributed pilot tones selected for the same 484-subcarrier RU), and may be replaced with a neighboring distributed data subcarrier so that new pilot tones for applicable sized distributed RUs may be at least 1 MHz apart and on even numbered subcarriers. In such an embodiment, the new pilot tone may be the $23^{rd}$ subcarrier 800-23 with a subcarrier index of 400 in 80 MHz tone plan. In some embodiments, FIG. 8C depicts a $10^{th}$ 26-subcarrier RU mapped to 80 MHz with a spreading factor $D_{TM}$ equal to 13.

Figure 9:
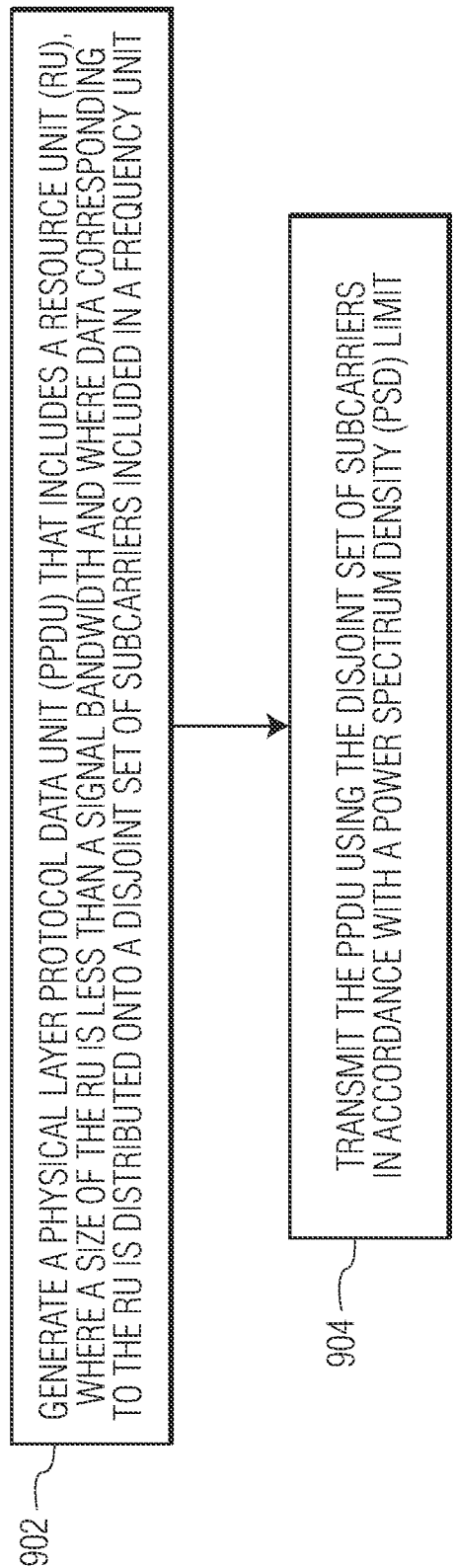
FIG. 9 illustrates a flow diagram of a technique for wireless communications in accordance with an embodiment of the invention.

FIG. 9 illustrates a flow diagram of a technique for wireless communications in accordance with an embodiment of the invention. At block 902, a PPDU that includes an RU may be generated, where a size of the RU is less than a signal bandwidth and where data corresponding to the RU is distributed onto a disjoint set of subcarriers included in a frequency unit. At block 904, the PPDU using the disjoint set of subcarriers may be transmitted in accordance with a PSD limit.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for wireless communications, the method comprising:
   generating in response to a trigger frame, a Physical Layer Protocol Data Unit (PPDU) that includes a resource unit (RU), wherein a size of the RU is less than a signal bandwidth and wherein data corresponding to the RU is distributed onto a disjoint set of subcarriers included in a frequency unit; and
   transmitting the PPDU using the disjoint set of subcarriers in accordance with a power spectrum density (PSD) limit;
   wherein the data of the RU is distributed onto the disjoint set of subcarriers in the frequency unit of the PPDU based on one or more RU type bits included in the trigger frame, the one or more RU type bits indicating that the data corresponding to the RU in the PPDU is distributed across the signal bandwidth.

2. The method of claim 1, wherein the PPDU using the disjoint set of subcarriers is at least one of transmitted and solicited using Orthogonal Frequency-Division Multiple Access (OFDMA).

3. The method of claim 1, wherein generating the PPDU comprises encoding a data portion of the PPDU using an encoding bandwidth and distributing the data corresponding to the RU onto the disjoint set of subcarriers across the signal bandwidth.

4. The method of claim 3, wherein the encoding bandwidth is 20 Megahertz (MHz) and the signal bandwidth is 40 MHz, and wherein the data corresponding to the RU is distributed onto even subcarriers of two 242 RUs via a round robin distribution.

5. The method of claim 3, wherein the encoding bandwidth is 40 MHz and the signal bandwidth is at least 80 MHz, and wherein the data corresponding to the RU is encoded using a 484 RU that is distributed onto each 484 RU of the signal bandwidth.

6. The method of claim 1, wherein generating the PPDU comprises encoding a data portion of the PPDU using a distributed RU (dRU) within the frequency unit, and wherein data corresponding to the dRU is encoded and modulated as one regular RU.

7. The method of claim 6, wherein a dRU tone mapper distributes the data corresponding to the RU onto the disjoint set of subcarriers included in the frequency unit.

8. The method of claim 6, wherein a number of subcarriers included in the dRU is the same as the number of subcarriers included in a corresponding regular RU.

9. The method of claim 6, wherein the frequency unit is 20 MHz, and wherein each 20 MHz of the signal bandwidth includes at least one of nine 26-subcarrier dRUs that are each nine subcarriers apart and thirteen 18-subcarrier dRUs that are each thirteen subcarriers apart.

10. The method of claim 6, wherein the frequency unit is 40 MHz, and wherein the signal bandwidth includes a base dRU that is at least one of a 26-subcarrier dRU and an 18-subcarrier dRU.

11. The method of claim 1, wherein the frequency unit is at least one of 20 MHz, 40 MHz, and 80 MHz.

12. The method of claim 11, wherein a base dRU is duplicated across at least two 20 MHz frequency units included in the signal bandwidth using at least one of a Dual Carrier Modulation (DCM), a Quadrature Carrier Modulation (QCM), and a phase change.

13. The method of claim 12, wherein the base dRU is duplicated across at least two 40 MHz frequency units included in the signal bandwidth using at least one of a DCM, a QCM, and a phase change.

14. The method of claim 1, wherein for up-link (UL) triggered transmissions, the RU is at least one of a regular RU and a distributed RU that is signaled by the one or more RU type bits included in a trigger frame.

15. The method of claim 14, wherein the one or more RU type bits is included in at least one of a User Info field and a Common Info field.

16. The method of claim 14, wherein the one or more RU type bits included in the trigger frame is one bit that indicates whether each RU is at least one of the regular RU and the distributed RU.

17. The method of claim 14, wherein the one or more RU type bits included in the trigger frame is an N bit field that indicates whether RUs within each frequency unit are at least one of the regular RU and the distributed RU.

18. The method of claim 1, wherein a payload of one user is transmitted on different RUs via different data symbols included in the PPDU in a dispersed RU transmission.

19. The method of claim 1, wherein the data corresponding to the RU is distributed onto the disjoint set of subcarriers using a Global Distributed Tone Mapping ($D_{TM}$) subcarrier distribution style that maps pilot tones for the RU size onto even number subcarriers.

20. A wireless device, the wireless device comprising:
a processor configured to:
generate in response to a trigger frame, a Physical Layer Protocol Data Unit (PPDU) that includes a resource unit (RU), wherein a size of the RU is less than a signal bandwidth and wherein data corresponding to the RU is distributed onto a disjoint set of subcarriers included in a frequency unit; and
transmit the PPDU using the disjoint set of subcarriers in accordance with a power spectrum density (PSD) limit;
wherein the data of the RU is distributed onto the disjoint set of subcarriers in the frequency unit of the PPDU based on one or more RU type bits included in the trigger frame, the one or more RU type bits indicating that the data corresponding to the RU in the PPDU is distributed across the signal bandwidth.

21. A method of claim 1, wherein the one or more RU type bits are included in at least one of a User Info field and a Common Info field of the trigger frame, the one or more RU type bits in the User Info field being in a Reserve field of the User Info field or in a Reserve field of a Trigger Dependent User Info field of the User Info field and the one or more RU type bits in the Common Info field being in a Reserved field of the Common Info field or Special Aid User Info field of the Common Info field.

22. The wireless device of claim 20, wherein the one or more RU type bits are included in at least one of a User Info field and a Common Info field of the trigger frame, the one or more RU type bits in the User Info field being in a Reserve field of the User Info field or in a Reserve field of a Trigger Dependent User Info field of the User Info field and the one or more RU type bits in the Common Info field being in a Reserved field of the Common Info field or Special Aid User Info field of the Common Info field.

* * * * *